(12) United States Patent
Byun et al.

(10) Patent No.: US 11,882,515 B2
(45) Date of Patent: *Jan. 23, 2024

(54) METHOD AND DEVICE FOR PROVIDING SYSTEM INFORMATION

(71) Applicant: LG Electronics Inc., Seoul (KR)

(72) Inventors: Daewook Byun, Seoul (KR); Jian Xu, Seoul (KR); Sangwon Kim, Seoul (KR); Seokjung Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,247

(22) Filed: Apr. 20, 2022

(65) Prior Publication Data
US 2022/0248306 A1 Aug. 4, 2022

Related U.S. Application Data

(63) Continuation of application No. 16/711,163, filed on Dec. 11, 2019, now Pat. No. 11,375,436, which is a
(Continued)

(30) Foreign Application Priority Data

Apr. 11, 2018 (KR) .................. 10-2018-0041939

(51) Int. Cl.
*H04W 48/10* (2009.01)
*H04W 74/08* (2009.01)
(Continued)

(52) U.S. Cl.
CPC ........... *H04W 48/10* (2013.01); *H04W 48/14* (2013.01); *H04W 72/23* (2023.01); *H04W 74/0833* (2013.01); *H04W 88/08* (2013.01)

(58) Field of Classification Search
CPC ..... H04W 48/10; H04W 48/12; H04W 48/14; H04W 72/005; H04W 72/042; H04W 74/0833; H04W 88/08
See application file for complete search history.

(56) References Cited

U.S. PATENT DOCUMENTS 8,014,343 B2 9/2011 Wang et al.
10,512,030 B2 12/2019 Byun et al.
(Continued)

FOREIGN PATENT DOCUMENTS

CN 101682188 3/2010
EP 3038428 6/2016
(Continued)

OTHER PUBLICATIONS

Australian Office Action in Australian Application No. 2018251514, dated Aug. 16, 2019, 3 pages.
(Continued)

*Primary Examiner* — Kibrom T Hailu
(74) *Attorney, Agent, or Firm* — Fish & Richardson P.C.

(57) ABSTRACT

Provided are a method for a distributed unit (DU) of a base station (BS) to broadcast system information in a wireless communication system, and a device supporting the same. The method may include: receiving system information owned by a central unit (CU) of the BS from the CU of the BS; receiving a request for the system information from a user equipment (UE); receiving a message of a command to broadcast the system information from the CU of the BS; and broadcasting the requested system information.

17 Claims, 18 Drawing Sheets

Related U.S. Application Data continuation of application No. 16/048,848, filed on Jul. 30, 2018, now Pat. No. 10,512,030, which is a continuation of application No. PCT/KR2018/004251, filed on Apr. 11, 2018.

(60) Provisional application No. 62/529,442, filed on Jul. 6, 2017, provisional application No. 62/519,889, filed on Jun. 15, 2017, provisional application No. 62/492,327, filed on May 1, 2017, provisional application No. 62/484,897, filed on Apr. 13, 2017.

(51) Int. Cl.
*H04W 88/08* (2009.01)
*H04W 48/14* (2009.01)
*H04W 72/23* (2023.01)

(56) References Cited

U.S. PATENT DOCUMENTS

| | | | |
|---|---|---|---|
| 10,973,000 B2* | 4/2021 | Jia | H04W 76/27 |
| 10,979,944 B2 | 4/2021 | Yiu | |
| 11,375,436 B2* | 6/2022 | Byun | H04W 48/14 |
| 2009/0318170 A1 | 12/2009 | Lee et al. | |
| 2011/0194441 A1 | 8/2011 | Jung et al. | |
| 2016/0234736 A1 | 8/2016 | Kubota | |
| 2017/0055187 A1 | 2/2017 | Kang et al. | |
| 2017/0208516 A1 | 7/2017 | Kubota et al. | |
| 2018/0049261 A1 | 2/2018 | Tenny et al. | |
| 2018/0109912 A1 | 4/2018 | Kang et al. | |
| 2018/0206178 A1 | 7/2018 | Tenny et al. | |
| 2018/0213579 A1 | 7/2018 | Hong et al. | |
| 2018/0279342 A1 | 9/2018 | Takiguchi et al. | |
| 2019/0159024 A1* | 5/2019 | Rost | H04W 12/0433 |
| 2019/0349822 A1 | 11/2019 | Kim et al. | |
| 2019/0364462 A1 | 11/2019 | Kim et al. | |
| 2020/0022109 A1* | 1/2020 | Wang | H04W 80/02 |

FOREIGN PATENT DOCUMENTS

| | | |
|---|---|---|
| JP | 2007511955 | 5/2007 |
| KR | 20080039818 | 5/2008 |
| KR | 20110093612 | 8/2011 |
| KR | 20160135090 | 11/2016 |
| KR | 20170022933 | 3/2017 |
| RU | 2308806 | 10/2007 |
| WO | WO2018130114 | 7/2018 |

OTHER PUBLICATIONS

CATT, "Control plane for support of NR standalone operation," R2-163468, 3GPP TSG RAN WG2 Meeting #94, Nanjing, China, May 23-27, 2016, 5 pages.

CATT, "Consideration on the RRC message transfer between CU and DU", R3-171456, 3GPP TSG RAN WG3 Meeting #96, Hangzhou, China, May 15-19, 2017, 3 pages.

CATT, "Procedures of on demand SI delivery and error handling", R2-1704236, 3GPP TSG-RAN WG2 Meeting #98, Hangzhou, China, May 15-19, 2017, 5 pages.

CMCC, "Architectural aspect of split options 3/5/7," R3-161811, 3GPP TSG RAN WG3 Meeting #93, Goteborg, Sweden, Aug. 22-26, 2016, 7 pages.

CN Office Action in Chinese Appln. No. 201880021567.3, dated Jan. 6, 2021, 17 pages (with English translation).

EP Supplementary Search Report in European Application No. EP 18784633, dated Feb. 5, 2020, 14 pages.

Ericsson, "Open issues of on-demand SI," R2-1702857, 3GPP TSG-RAN WG2 #97bis, Spokane, USA, Apr. 3-7, 2017, 7 pages.

Huawei, "Discussion on TS framework general aspects and principles for CU DU interface," R3-171229, 3GPP TSG-RAN3 Meeting #95bis, Spokane, USA, Apr. 3-7, 2017, 9 pages.

Huawei, HiSilicon, "System Information Delivery over F1," R3-171850, NB3GPP TSG RAN WG3 Meeting #96, Hangzhou, China, dated May 15 -19, 2017, 2 pages.

India Office Action in India Appln. No. 201917006916, dated Jul. 9, 2020, 7 pages.

LG Electronics Inc., "Functions of the F1 interface", R3-171548, 3GPP TSG-RAN WG3 Meeting #96, Hangzhou, China, May 15, 2017-May 19, 2017, 4 pages.

Nokia, "Signalling for on-demand system information," 3GPP TSG-RAN WG2 Meeting #97bis, Apr. 3-7, 2017.

Nokia, Alcatel-Lucent Shanghai Bell, KT, "F1 interface RAN3 stage 2-38.401," R3-171362, 3GPP TSG-RAN WG3 Meeting #95-bis, Spokane, USA, Apr. 3-7, 2017, 6 pages.

NTT Docomo, Inc., "CU-DU interface: Overall categorization of C-plane and U-plane", R3-170618, TSG-RAN Working Group 3 meeting #95, Athens, Greece, Feb. 13-17, 2017, 9 pages.

RU Notice of Allowance in Russian Appln. No. 2019108844/07, dated May 23, 2020, 23 pages (with English translation).

Samsung, "System Information Signalling Design in NR," R2-163371, 3GPP TSG-RAN WG2 Meeting #94, Nanjing, China, May 23-27, 2016, 7 pages.

Singapore Office Action in Singapore Application No. 11201900188U, dated Apr. 14, 2020, 8 pages.

* cited by examiner

METHOD AND DEVICE FOR PROVIDING SYSTEM INFORMATION

CROSS-REFERENCE TO RELATED APPLICATIONS

This application is a continuation of U.S. application Ser. No. 16/711,163, filed on Dec. 11, 2019, which is a continuation of U.S. application Ser. No. 16/048,848, filed on Jul. 30, 2018, now U.S. Pat. No. 10,512,030, which is a continuation pursuant to 35 U.S.C. § 119(e) of International Application PCT/KR2018/004251, with an international filing date of Apr. 11, 2018, which claims the benefit of U.S. Provisional Patent Applications Nos. 62/484,897 filed on Apr. 13, 2017, 62/492,327 filed on May 1, 2017, 62/519,889 filed on Jun. 15, 2017, 62/529,442 filed on Jul. 6, 2017 and Korean Patent Application No. 10-2018-0041939 filed in the Korean Intellectual Property Office on Apr. 11, 2018, the contents of which are hereby incorporated by reference herein in their entirety.

BACKGROUND OF THE INVENTION

Field of the Invention

The present invention relates to a wireless communication system and, more particularly, to a method for providing system information in a scenario where a central unit and a distributed unit of a base station are split and a device supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel. The SIB is common control information and is transmitted through a PDCCH differently from the MIB.

SUMMARY OF THE INVENTION

Considering that information generated in the RRC layer is transmitted to a user equipment (UE), the generated information needs to be transmitted to the UE through a distributed unit (DU). Since system information to be broadcast is also generated in the RRC layer of a central unit (CU), signaling between the CU and the DU may be required for the DU to broadcast the system information. For example, when the CU receives a request for system information from the UE via the DU, signaling between the CU and the DU may be required for the DU to broadcast the system information. However, in a scenario where the CU and the DU are split, there is no procedure for the DU to transmit system information requested by a UE to the UE. Therefore, it is necessary to propose a method for providing system information in a scenario where a CU and a DU are split and a device supporting the same.

According to an embodiment, there is provided a method for broadcasting, by a DU of a base station (BS), system information in a wireless communication system. The method may include: receiving system information owned by a CU of the BS from the CU of the BS; receiving a request for the system information from a UE; receiving a message of a command to broadcast the system information from the CU of the BS; and broadcasting the requested system information.

According to another embodiment, there is provided a DU of a BS for broadcasting system information in a wireless communication system. The DU of the BS may include: a memory; a transceiver; and a processor to connect the memory and the transceiver, wherein the processor may be configured to control the transceiver to: receive system information owned by a CU of the BS from the CU of the BS; receive a request for the system information from a UE; receive a message of a command to broadcast the requested system information from the CU of the BS; and broadcast the requested system information.

It is possible to efficiently provide system information.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
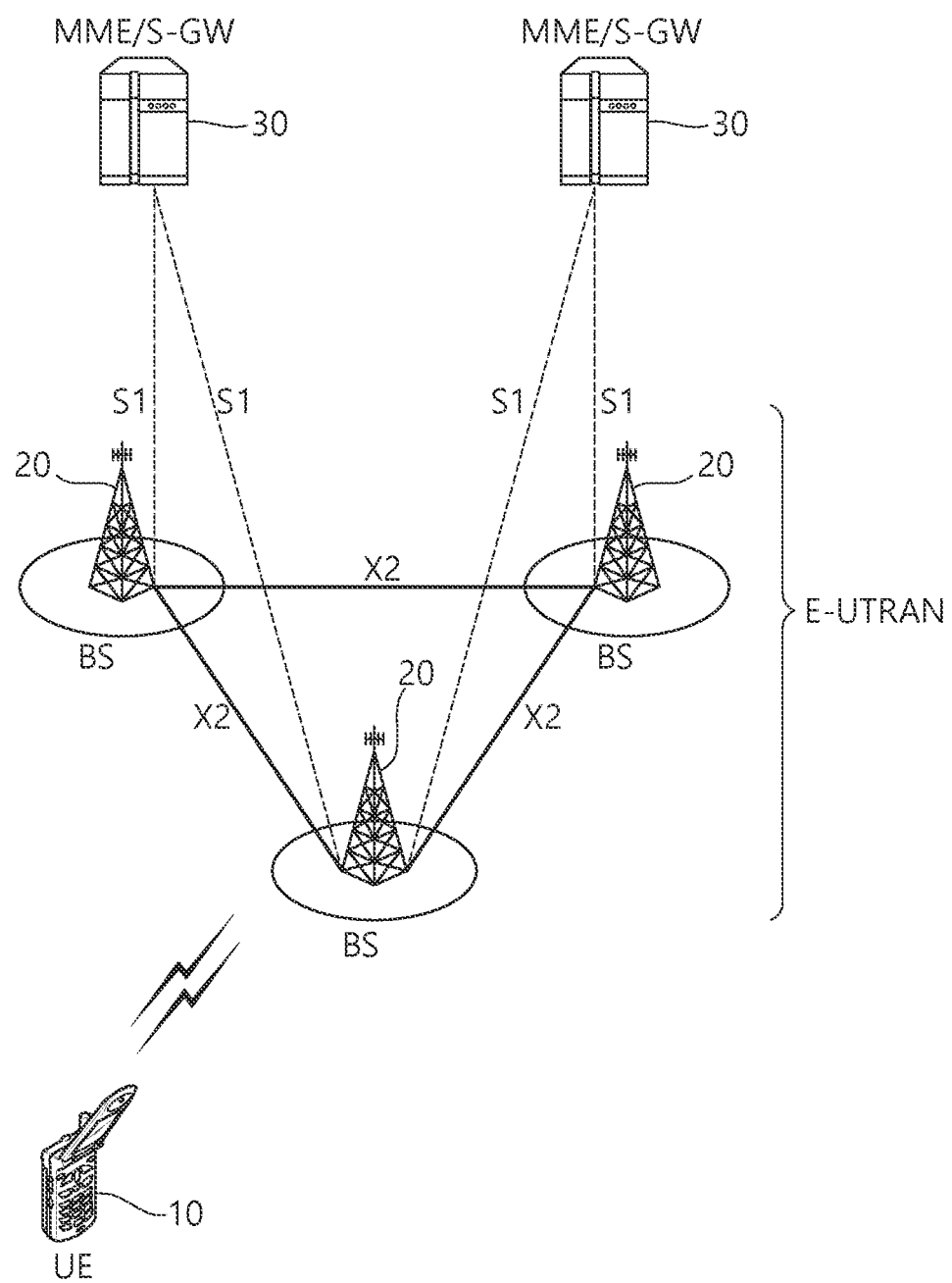
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
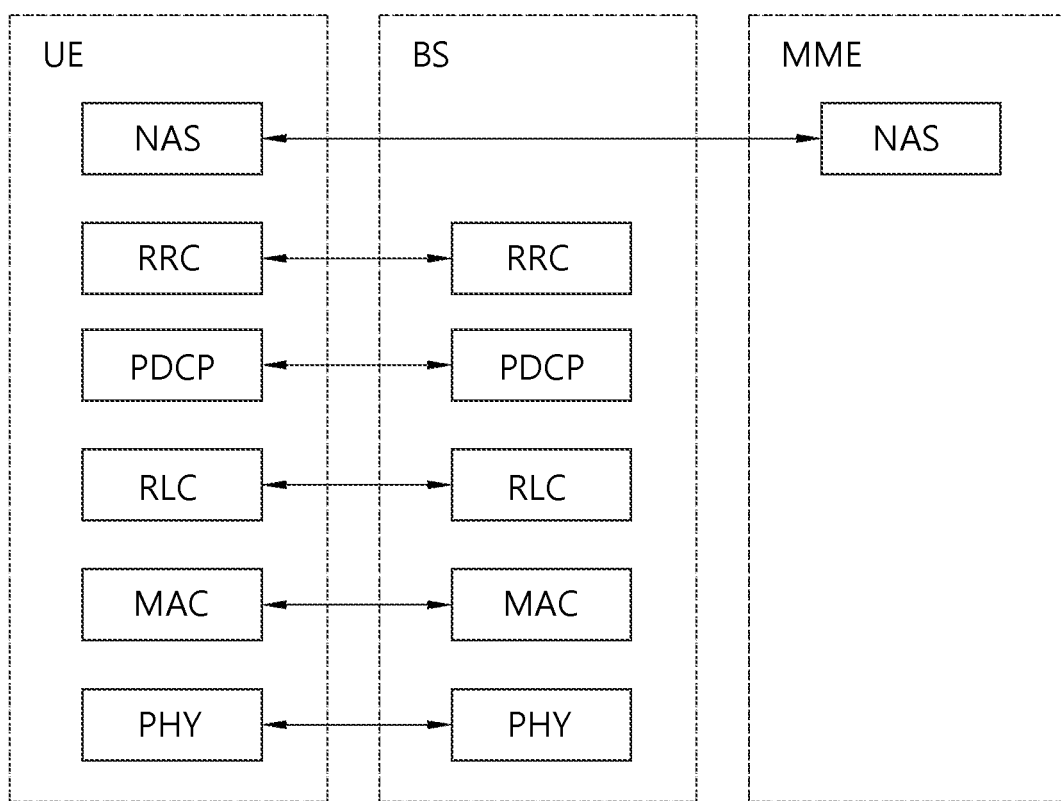
FIG. 2 shows a control plane of a radio interface protocol of an LTE system.
Figure 3:
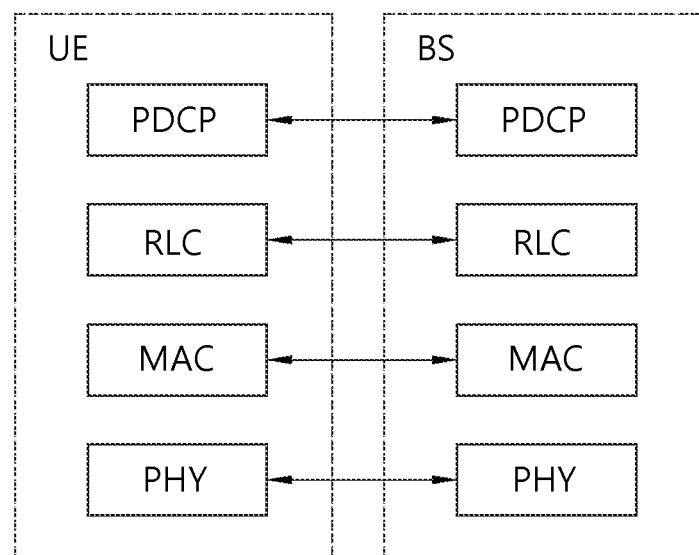
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
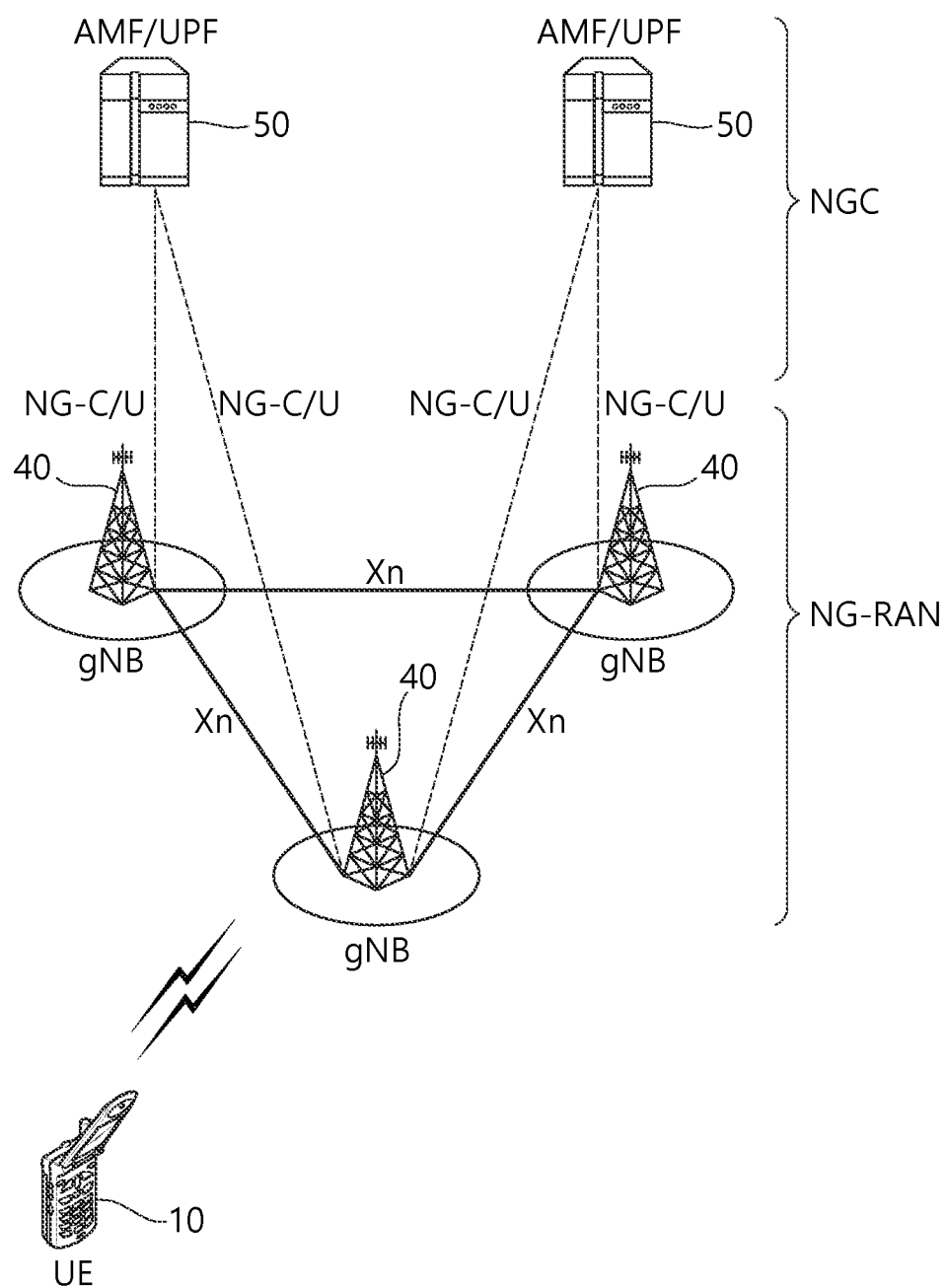
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, system information will be described.

Figure 5:
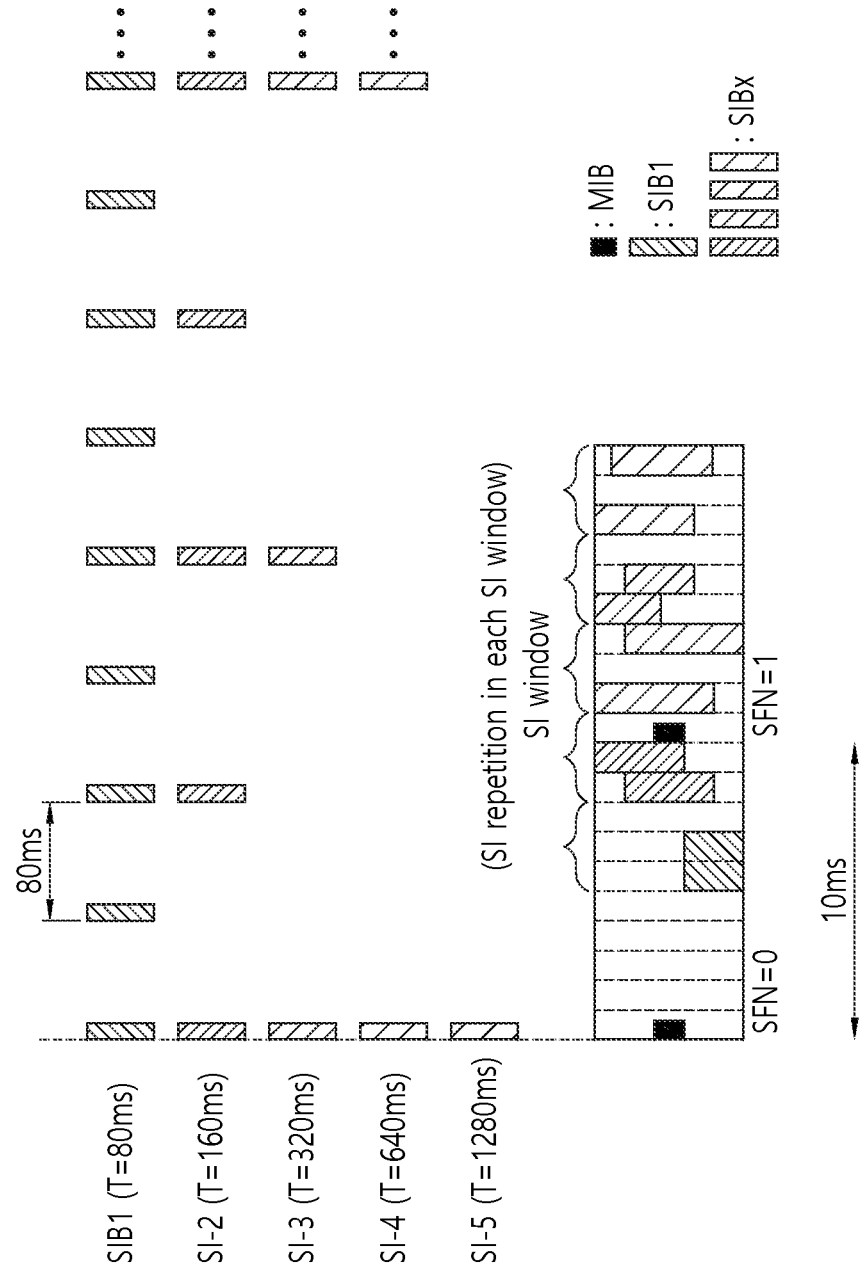
FIG. 5 shows an example of transmitting a master information block (MIB), system information block1 (SIB1), and other SIBs.

FIG. 5 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 5, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

Hereinafter, random access will be described.

Random access is used by a UE to obtain uplink synchronization with a BS or to be allocated an uplink radio resource. After power is turned on, a UE obtains downlink synchronization with an initial cell and receives system information. Then, the UE acquires, from the system information, a set of available random access preambles and information about a radio resource used for transmission of a random access preamble. The radio resource used for transmission of the random access preamble may be specified as a radio frame and/or a combination of at least one or more subframes. The UE transmits a random access preamble randomly selected from the set of random access preambles, and the BS having received the random access preamble sends a timing alignment (TA) value for uplink synchronization to the UE through a random access response. Thus, the UE obtains uplink synchronization.

That is, the BS allocates a dedicated random access preamble to a specific UE, and the UE performs non-contention random access using the random access preamble. That is, there may be in a process of selecting a random access preamble, contention-based random access in which a UE randomly selects and uses one random access preamble from a particular set and non-contention random access in which only a specific UE is allocated a random access preamble by a BS. Non-contention random access may be used for a handover procedure or upon a request by a BS's command.

Figure 6:
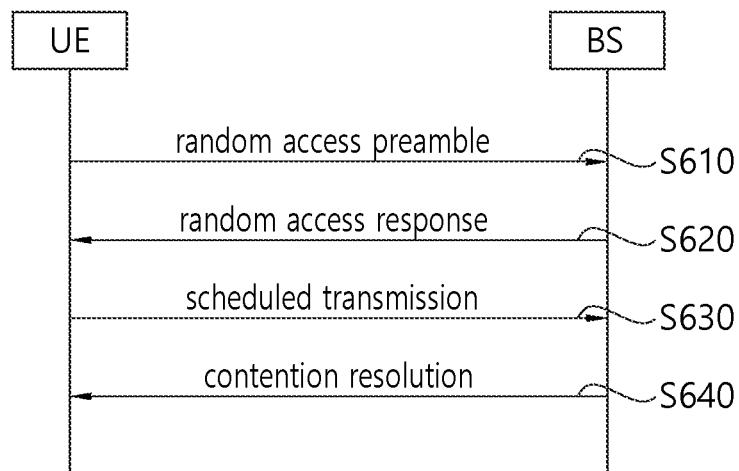
FIG. 6 illustrates a contention-based random access procedure.

FIG. 6 illustrates a contention-based random access procedure.

Referring to FIG. 6, a UE randomly selects one random access preamble from a random access preamble set indicated by system information or a handover command. The UE selects a radio resource for transmitting the random access preamble to transmit the selected random access preamble (S610). The radio resource may be a specific subframe, and selecting the radio resource may be selecting a physical random access channel (PRACH).

After transmitting the random access preamble, the UE attempts to receive a random access response within a random access response reception window indicated by the system information or the handover command and accordingly receives a random access response (S620). The random access response may be transmitted in an MAC PDU format, and the MAC PDU may be forwarded via a physical downlink shared channel (PDSCH). Further, a physical downlink control channel (PDCCH) is also forwarded so that the UE properly receives information forwarded via the PDSCH. That is, the PDCCH includes information on the UE receiving the PDSCH, frequency and time information on a radio resource for the PDSCH, and a transmission format for the PDSCH. Once successfully receiving the PDCCH forwarded to the UE, the UE properly receives the random access response transmitted via the PDSCH on the basis of the information in the PDCCH.

The random access response may include a random access preamble identifier (ID), an uplink radio resource (UL grant), a temporary cell-radio network temporary identifier (C-RNTI), and a time alignment command (TAC). Since one random access response may include random access response information for one or more UEs, a random access preamble ID may be included to indicate a UE for which a UL grant, a temporary C-RNTI, and a TAC are valid. The random access preamble ID may be an ID of the random access preamble received by a BS. The TAC may be included as information for the UE to adjust uplink synchronization. The random access response may be indicated by a random access ID on the PDCCH, that is, a random access-radio network temporary identifier (RA-RNTI).

When the UE receives the random access response valid therefor, the UE processes information included in the random access response and performs scheduled transmission to the BS (S630). That is, the UE applies the TAC and stores the temporary C-RNTI. Further, the UE transmits data stored in a buffer of the UE or newly generated data to the BS using the UL grant. In this case, information to identify the UE needs to be included, which is for identifying the UE in order to avoid a collision since the BS does not determine which UEs perform random access in a contention-based random access process.

There are two methods for including information for identifying a UE. When the UE has a valid cell ID already allocated by a corresponding cell before performing random access, the UE transmits the cell ID thereof through the UL grant. However, when the UE is not allocated a valid cell ID before the random access process, the UE transmits a unique ID thereof (e.g., S-TMSI or random ID). Generally, the unique ID is longer than the cell ID. When the UE transmits the data via the UL grant, the UE starts a contention resolution timer.

After transmitting the data including the ID of the UE through the UL grant allocated by receiving the random access response, the UE waits for an instruction from the BS to avoid a collision (S640). That is, the UE attempts to receive the PDCCH in order to receive a specific message. There are two proposed methods for receiving a PDCCH. As described above, when the ID of the UE transmitted via the UL grant is a cell ID, the UE may attempt to receive the PDCCH using the cell ID of the UE. In this case, when the UE receives the PDCCH through the cell ID of the UE before the contention resolution timer expires, the UE determines that random access has been normally performed and terminates random access. When the ID transmitted via the UL grant is the unique ID, the UE may attempt to receive the PDCCH using the temporary C-RNTI included in the random access response. In this case, when the UE receives the PDCCH through the temporary cell ID before the contention resolution timer expires, the UE identifies data forwarded by the PDSCH indicated by the PDCCH. When the data includes the unique ID of the UE, the UE may determine that random access has been normally performed and may terminate random access.

Figure 7:
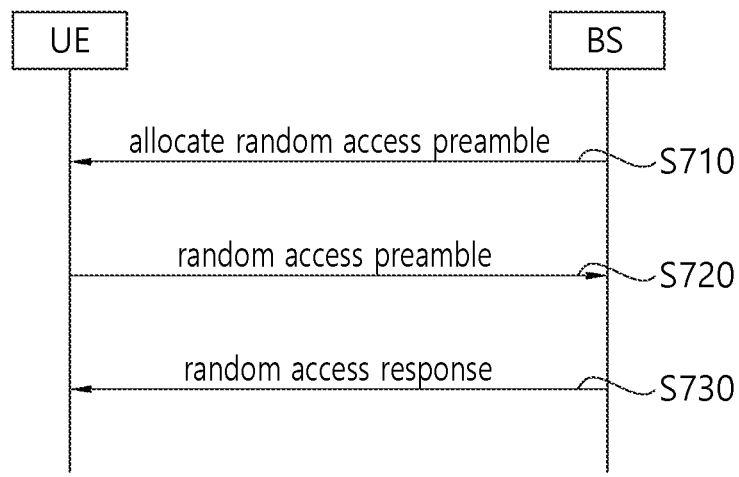
FIG. 7 illustrates a non-contention random access procedure.

FIG. 7 illustrates a non-contention random access procedure.

Unlike contention-based random access, non-contention random access may be terminated when a UE receives a random access response.

Non-contention random access may be initiated by a request, such as a handover and/or a command from a BS. Here, in these two cases, contention-based random access may also be performed.

The UE is allocated by the BS a designated random access preamble having no possibility of a collision. The random access preamble may be allocated through a handover command and a PDCCH command (S710).

After being allocated the random access preamble designated for the UE, the UE transmits the random access preamble to the BS (S720).

Upon receiving the random access preamble, the BS transmits a random access response to the UE in response (S730). A procedure associated with the random access response has been mentioned above in S620 of FIG. 6.

The number of system information blocks is continuously increasing, and radio resources are required to broadcast a system information block. Thus, as the number of system information blocks increases, the quantity of radio resources required to broadcast a system information block also inevitably increases. To solve such a problem, new-type system information is proposed.

Figure 8:
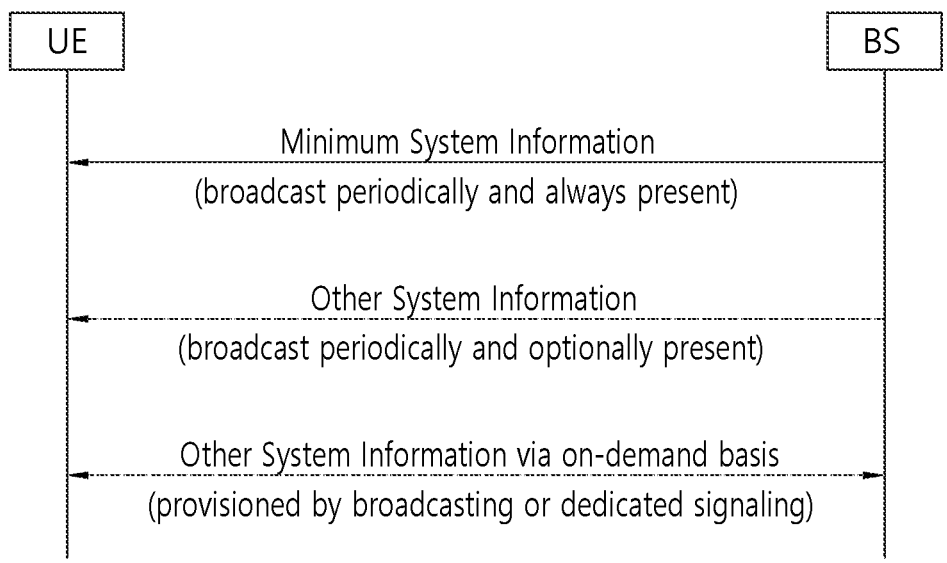
FIG. 8 shows a procedure for a UE to receive new-type system information.

FIG. 8 shows a procedure for a UE to receive new-type system information.

Referring to FIG. 8, the new-type system information may be divided into minimum system information and other system information. The minimum system information may be periodically broadcasted. The minimum system information may include basic information required for initial access to a cell and information for acquiring any other system information that is provisioned on an on-demand basis or is periodically broadcasted. The minimum system information may include at least one of a SFN, a list of PLMNs, a cell ID, a cell camping parameter, and a RACH parameter. When a network allows an on-demand mechanism, a parameter required to request the other system information may be included in the minimum system information. The other system information may refer to all system information not broadcast in the minimum system information.

Hereinafter, an RRC_INACTIVE state of a UE will be described.

In a discussion on the standardization of new radio (NR), an RRC_INACTIVE state is newly introduced in addition to an existing RRC_CONNECTED state and an existing RRC_IDLE state. The RRC_INACTIVE state is a state introduced to efficiently manage a particular UE (e.g., mMTC UE). A UE in the RRC_INACTIVE state performs a radio control procedure similar to that of a UE in the RRC_IDLE state in order to reduce power consumption. However, the UE in the RRC_INACTIVE state maintains the state of connection between the UE and a network similar to the RRC_CONNECTED state in order to minimize a control procedure necessary for the transition to the RRC_CONNECTED state. In the RRC_INACTIVE state, a radio access resource is released, whereas a wired connection may be maintained. For example, in the RRC_INACTIVE state, a radio access resource is released, whereas an NG interface between a gNB and an NGC or an S1 interface between an eNB and an EPC may be maintained. In the RRC_INACTIVE state, a core network recognizes that the UE is normally connected to a BS. However, the BS may not perform connection management for the UE in the RRC_INACTIVE state.

For a UE in a lightly connected mode, an MME may maintain the S1 connection of the activated UE in order to hide state transition and mobility from the core network. That is, for the UE in the RRC_INACTIVE state, an AMF may maintain the NG connection of the activated UE in order to hide the transition and mobility from a next generation core (NGC). In the present specification, the RRC_INACTIVE state may be used in a similar sense to a lightly connected mode, a lightweight connected mode, or a semi-connected mode.

Hereinafter, a 5G RAN deployment scenario will be described.

A 5G RAN may be classified into a 'non-centralized deployment' scenario, a 'co-sited deployment with E-UTRA' scenario, and a 'centralized deployment' scenario according to a shape of deploying a function of a BS in a central unit and a distributed unit and according to whether it coexists with a 4G BS. In this specification, the 5G RAN, a gNB, a next generation node B, a new RAN, and a new radio BS (NR BS) may imply a newly defined BS for 5G.

Figure 9:
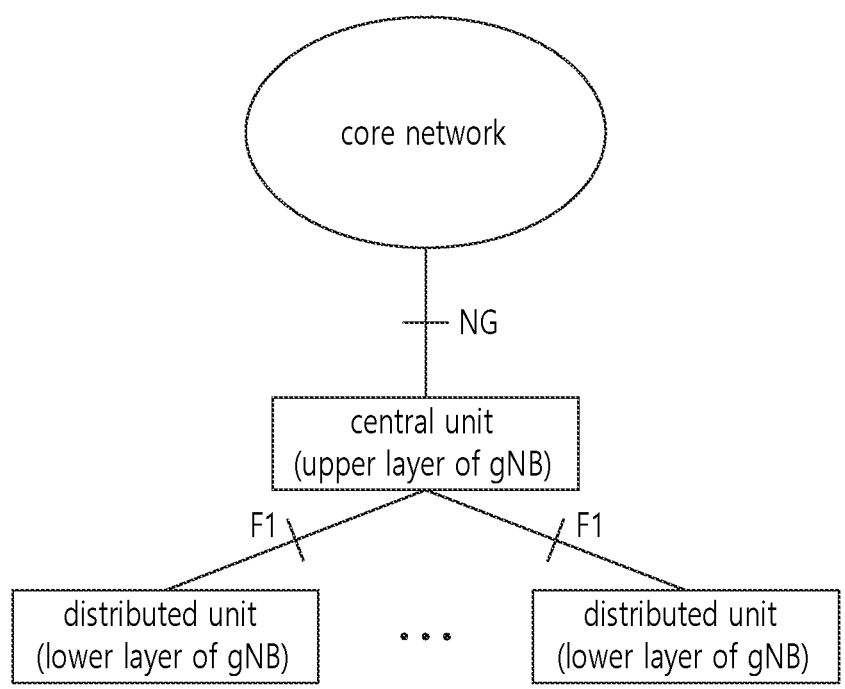
FIG. 9 shows a split-type gNB deployment (centralized deployment) scenario.

FIG. 9 shows a split-type gNB deployment (centralized deployment) scenario.

Referring to FIG. 9, a gNB may be split into a central unit and a distributed unit. That is, the gNB may be operated by being split in a layered manner. The central unit may perform a function of upper layers of the gNB, and the distributed unit may perform a function of lower layers of the gNB.

Figure 10:
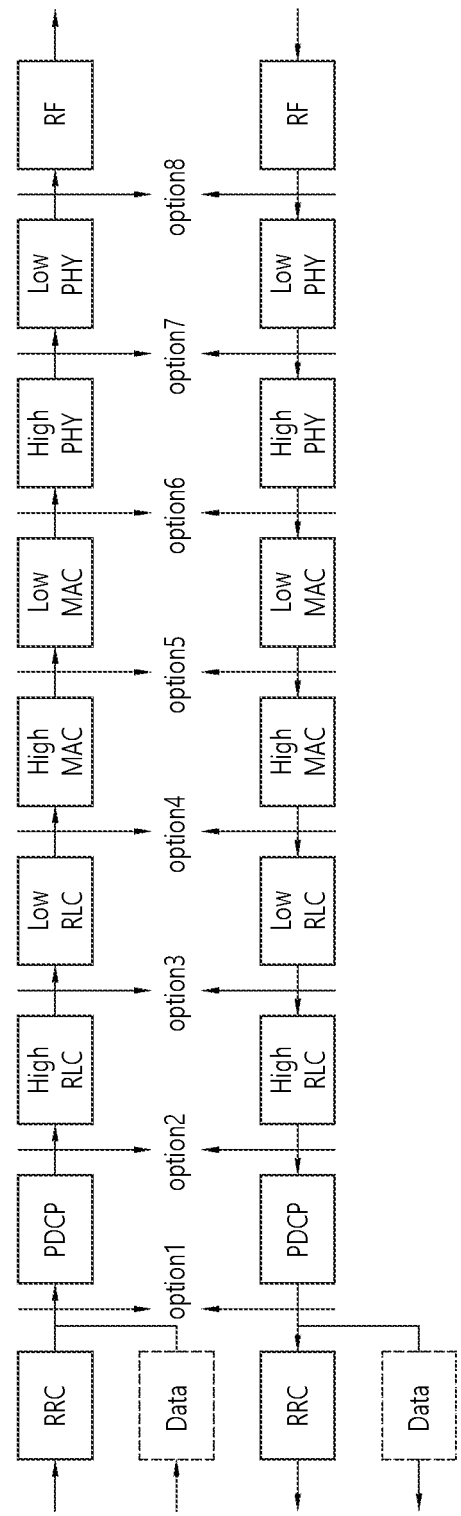
FIG. 10 shows a function split between a central unit and a distributed unit in a split-type gNB deployment scenario.

FIG. 10 shows a function split between a central unit and a distributed unit in a split-type gNB deployment scenario.

Referring to FIG. 10, in case of an option 1, an RRC layer is in a central unit, and an RLC layer, a MAC layer, a physical layer, and an RF are in a distributed unit. In case of an option 2, the RRC layer and the PDCP layer are in the central unit, and the RLC layer, the MAC layer, the physical layer, and the RF are in the distributed unit. In case of an option 3, the RRC layer, the PDCP layer, and an upper RLC layer are in the central unit, and a lower RLC layer, the MAC layer, the physical layer, and the RF are in the central unit. In case of an option 4, the RRC layer, the PDCP layer, and the RLC layer are in the central unit, and the MAC layer, the physical layer, and the RF are in the distributed unit. In case of an option 5, the RRC layer, the PDCP layer, the RLC layer, and an upper MAC layer are in the central unit, and a lower MAC layer, the physical layer, and the RF are in the distributed unit. In case of an option 6, the RRC layer, the PDCP layer, the RLC layer, and the MAC layer are in the central unit, and the physical layer and the RF are in the distributed unit. In case of an option 7, the RRC layer, the PDCP layer, the RLC layer, the MAC layer, and an upper physical layer are in the central unit, and a lower physical layer and the RF are in the distributed unit. In case of an option 8, the RRC layer, the PDCP layer, the RLC layer, the MAC layer, and the physical layer are in the central unit, and the RF is in the distributed unit.

Hereinafter, the central unit may be referred to as a CU, and the distributed unit may be referred to as a DU in the present specification. The CU may be a logical node which hosts a radio resource control (RRC), service data adaptation protocol (SDAP), and packet data convergence protocol (PDCP) layers of the gNB. The DU may be a logical node which hosts radio link control (RLC), media access control (MAC), and physical (PHY) layers of the gNB. Alternatively, the CU may be a logical node which hosts RRC and PDCP layers of an en-gNB.

Considering that information generated in the RRC layer is transmitted to a UE, the generated information needs to be transmitted to the UE through the DU. Since system information to be broadcast is also generated in the RRC layer of the CU, signaling between the CU and the DU may be required for the DU to broadcast the system information. For example, when the CU receives a request for system information from the UE via the DU, signaling between the CU and the DU may be required for the DU to broadcast the system information. However, in a scenario where the CU and the DU are split, there is no procedure for the DU to transmit system information requested by a UE to the UE. Hereinafter, a method for providing system information in a scenario where a CU and a DU are split and a device supporting the same will be described according to an embodiment of the present invention.

Figure 11:
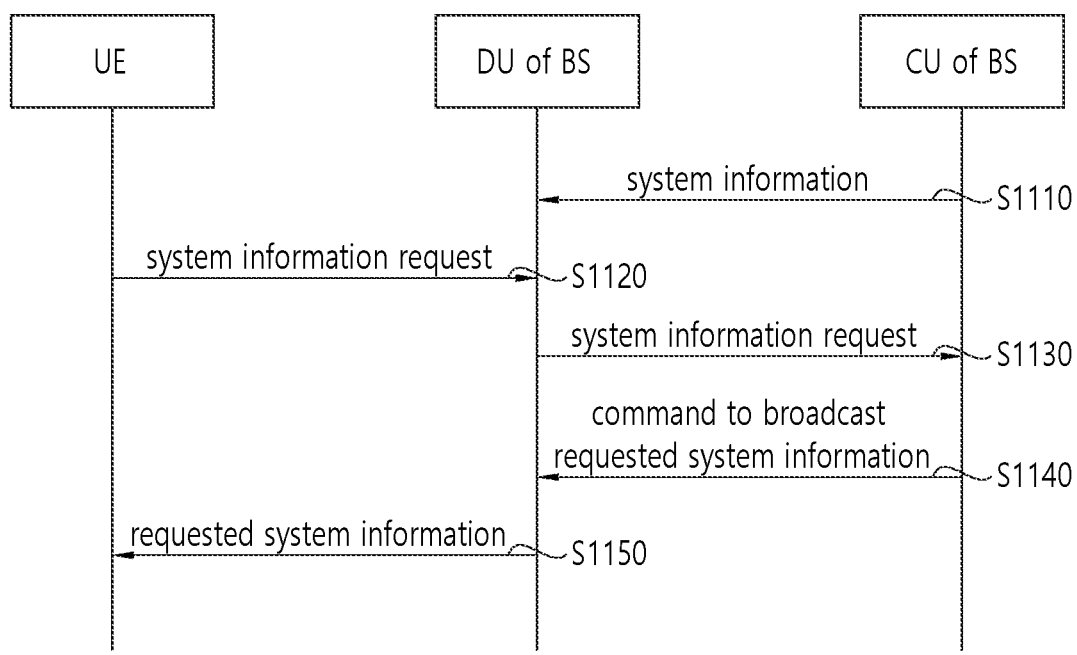
FIG. 11 illustrates a procedure for providing system information according to an embodiment of the present invention.

FIG. 11 illustrates a procedure for providing system information according to an embodiment of the present invention.

Referring to FIG. 11, in step S1110, a DU of a BS may receive system information from a CU of the BS. The system information may be received via an F1 interface. The F1 interface may refer to an interface between the CU and the DU. The system information may be system information owned by the CU of the BS. The DU of the BS may receive, from the CU, all other system information excluding SIB1 among the system information owned by the CU. The system information owned by the CU may be included in an RRC container. The system information owned by the CU of the BS may be transmitted from the CU of the BS to the DU of the BS in an F1 setup procedure. The system information may be included in an F1 setup response message.

Additionally, the DU of the BS may receive information related to the system information from the CU of the BS. The information related to the system information may include at least one of an SIB ID, a container including the system information (SI), timing information for broadcasting, logical channel-related information, broadcast activation, a DU ID, a cell ID, and a beam ID.

For example, the F1 setup response message may be defined as in Table 1.

TABLE 1

| IE/Group Name | Presence | Range | Semantics description | Criticality | Assigned Criticality |
|---|---|---|---|---|---|
| Message Type | M | | | YES | reject |
| Transaction ID | M | | | YES | reject |
| Cells to be Activated List | | 0 . . . 1 | | | |
| >Cells to be Activated List Item | | 1 . . . <maxCellingNBDU> | List of cells to be activated | YES | reject |
| >>NCGI | M | | | — | — |

TABLE 1-continued

| IE/Group Name | Presence | Range | Semantics description | Criticality | Assigned Criticality |
|---|---|---|---|---|---|
| >>gNB-CU System Information | M | | RRC container with system information owned by gNB-CU | — | — |
| >>PCI | O | | Physical Cell ID | — | — |

Referring to Table 1, the F1 setup response message transmitted from the CU to the DU may include gNB-CU system information. The gNB-CU system information may be an RRC container including the system information owned by the CU. For example, the gNB-CU system information may include all other system information excluding SIB1 among the system information owned by the CU.

In step S1120, the DU of the BS may receive a request for system information from the UE. The UE may be in the RRC_INACTIVE state. The UE may be in the RRC_IDLE state. The request for the system information from the UE may be included in message 3 in a random access procedure. When the request for the system information is transmitted via message 3, the DU of the BS may not interpret the message 3 because the DU has no RRC layer. Therefore, the DU of the BS needs to transmit message 3 to the CU of the BS. The system information may be on-demand system information or other system information.

In step S1130, the DU of the BS may transmit the request for the system information, received from the UE, to the CU. A message including a container piggybacking the request for the system information may be transmitted from the DU to the CU. The request for the system information may be included in an initial UL RRC message transfer message. The initial UL RRC message transfer message may be transmitted by the DU to forward an initial layer 3 message to the CU on the F1 interface.

For example, the initial UL RRC message transfer message may be defined as in Table 2.

TABLE 2

| IE/Group Name | Presence | Range | Semantics description | Criticality | Assigned Criticality |
|---|---|---|---|---|---|
| Message Type | M | | | YES | ignore |
| gNB-DU UE F1AP ID | M | | | YES | reject |
| NCGI | M | | NG-RAN Cell Global Identifier (NCGI) | YES | reject |
| C-RNTI | | | C-RNTI allocated at the gNB-DU | YES | reject |
| RRC-Container | M | | | YES | reject |
| DU to CU RRC Container | O | | CellGroupConfig IE. Required at least to carry SRB1 configuration | YES | reject |

In step S1140, the DU of the BS may receive, from the CU, a message of a command to broadcast the requested system information. The message may be a system information broadcast request message. The message may be a system information delivery command message. The message may include information indicating the requested system information. For example, the message may include an identity, an index, or a number for the requested system information. For example, the message may include another system information type. Thus, the DU may know that system information corresponding to the other system information type needs to be broadcast. Additionally, the message may include timing information for broadcasting. The timing information for broadcasting may be a time interval for broadcasting other system information.

For example, the system information broadcast request message or the system information delivery command message may be defined as in Table 3.

TABLE 3

| IE/Group Name | Presence | Range | IE type and reference | Semantics description | Criticality | Assigned Criticality |
|---|---|---|---|---|---|---|
| Message Type | M | | | | YES | reject |
| NCGI | M | | | NR cell identifier | — | |

TABLE 3-continued

| IE/Group Name | Presence | Range | IE type and reference | Semantics description | Criticality | Assigned Criticality |
|---|---|---|---|---|---|---|
| SI type list | | 1 | | | | |
| >SI type item IEs | | 1 ... <maxnoofSITypes> | | | | |
| >>Other SI Type | M | | ENUMERATED | Other SI Type | YES | reject |
| >>Broadcast Time Interval | M | | INTEGER | Time interval for broadcasting of Other SI | FFS | FFS |

Referring to Table 3, the CU of the BS may transmit the message including the other system information type to the DU, and the DU may broadcast the system information corresponding to the other system information type. Additionally, the CU of the BS may transmit a message including a broadcast time interval to the DU, and the DU may broadcast the system information corresponding to the other system information type on the basis of the broadcast time interval.

In step S1150, the DU of the BS may provide the requested system information to the UE on the basis of the received message. The system information may be provided to the UE through broadcast signaling or dedicated signaling.

According to the embodiment of the present invention, the CU may provide the DU with system information owned by the CU and information necessary to broadcast the system information. Upon receiving a request for system information from the UE, the DU may transmit the request to the CU and may receive, from the CU, information indicating the system information which needs to be broadcast or transmitted. The CU may provide SIB-related information in advance to the DU, thereby reducing signaling between the CU and the DU caused by the request for the system information from the UE. Further, the CU may transmit only the type of system information to be broadcast to the DU, thereby reducing signaling between the CU and the DU caused by the request for the system information from the UE.

Figure 12:
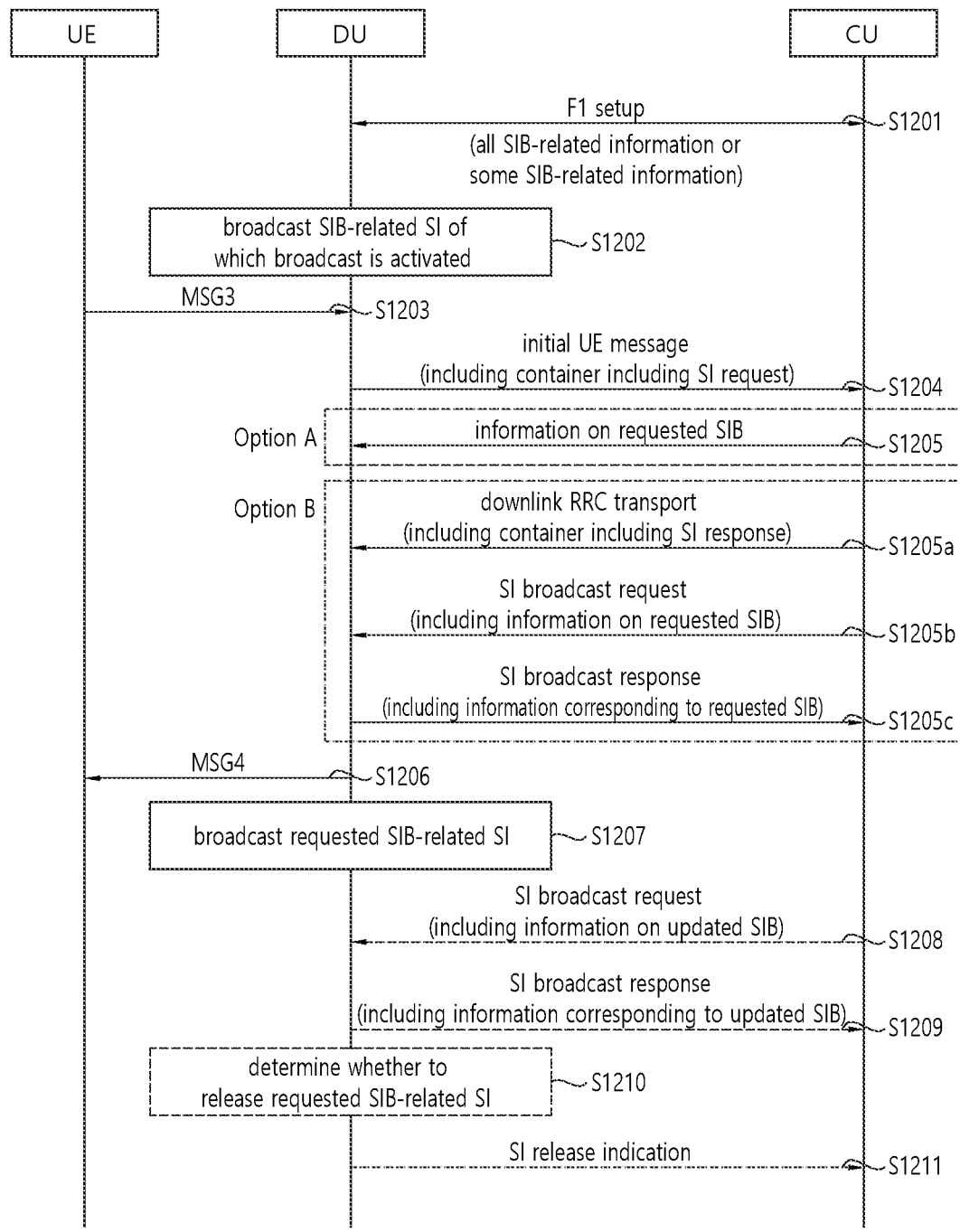
FIG. 12 illustrates a procedure for providing on-demand system information according to an embodiment of the present invention.

FIG. 12 illustrates a procedure for providing on-demand system information according to an embodiment of the present invention.

According to the embodiment of the present invention, a CU may provide a DU with an indication about a requested SIB. Alternatively, the CU may provide the DU with information related to the requested SIB. For example, when the DU receives a system information request from a UE via message 3 in a random access procedure, the indication about the requested SIB or the information related to the requested SIB may be provided to the DU from the CU.

According to the embodiment of the present invention, during an F1 setup procedure, the CU may provide the DU with information related to some or all of SIBs that the CU supports. For example, the CU may provide the DU with information related to all of system information owned by the CU. Alternatively, the CU may provide the DU with all other system information excluding SIB1 among the system information owned by the CU.

According to the embodiment of the present invention, when the CU determines to update the information related to the SIB, the CU may transmit the updated information related to the SIB to the DU. Also, when there is no request for on-demand system information regarding the requested SIB, the DU may release the information related to the requested SIB.

Referring to FIG. 12, in step S1201, when an F1 interface is set up, the CU may transmit, to the DU, a message including information related to all SIBs provided by the CU. Alternatively, the CU may transmit, to the DU, a message including information related to some SIBs provided by the CU. For example, the information related to some SIBs may be minimum system information or system information on an SIB frequently requested by a UE. The information related to some SIBs may be transmitted to efficiently manage resources of the DU for storing information related to an SIB. The message may be an F1 setup response message or an F1 setup request message. For example, the CU may transmit, to the DU, a message including information related to SIBx.

The information related to the SIB included in the message may be provided per SIB. The information related to the SIB may include at least one of an SIB ID, a container including system information, timing information for broadcasting, logical channel-related information, broadcast activation, a DU ID, a cell ID, and a beam ID.

The information related to the SIB may include system information and information necessary for the DU to broadcast the system information. The container may be used to transmit the system information including one or more parameters to be broadcast from the CU to the DU. The timing information for broadcasting may be information or time for assisting scheduling for the DU to broadcast the system information. For example, the timing information for broadcasting may include at least one of the length of a window in which the system information is broadcast, the number of times the system information is broadcast, or the location of the system information broadcast within the window. For each parameter in the SIB, there may be timing information for broadcasting per parameter, which may have a different value. The logical channel-related information may include logical channel information indicating a logical channel through which the system information is transmitted. For example, the logical channel information may be a logical channel ID. The broadcast activation may indicate whether the provided system information is broadcast. The broadcast activation may be set when the system information is always broadcast or is frequently requested by a UE. When the DU controls, manages, or covers one or more cells, the F1 setup response message or the F1 setup request message may include a cell ID of each cell. When the DU controls, manages, or covers one or more beams, the F1 setup response message or the F1 setup request message may include a beam ID of each beam.

In step S1202, after an F1 setup procedure is completed, the DU may broadcast the system information related to the SIB of which a broadcast is activated.

In step S1203, a UE may transmit a system information request to the DU in order to request on-demand system information. The system information request may be included in message 3 in a random access procedure. The UE may be in the RRC_IDLE state. The UE may be in the RRC_INACTIVE state. In the present specification, on-demand system information may be system information provided through broadcast signaling or dedicated signaling upon request from a UE.

In step S1204, upon receiving the system information request from the UE, the DU may transmit the system information request to the CU. A message including a container piggybacking the system information request may be transmitted from the DU to the CU. The message may be an initial UE message or a new message.

Upon receiving the message from the DU, the CU may identify the requested on-demand system information on the basis of the received system information request. There may be two possible options depending on whether the CU has provided the DU with the information related to all SIBs supported by the CU in step S1201.

(1) Option A

When the CU provides the DU with the information related to all SIBs owned by the CU, the CU may transmit information on a requested SIB to the DU in step S1205. The information on the requested SIB may indicate the requested SIB. The information on the requested SIB may be an identity, an index, or a number of the SIB identified on the basis of the system information request. For example, the CU may transmit an SIB type to the DU. Accordingly, the CU may command the DU to broadcast the requested SIB, and the DU may broadcast system information related to the indicated SIB.

Additionally, in step S1205, the CU may transmit, to the DU, a message including a container piggybacking a response to the system information request. The message may be a downlink RRC transport message or a new message.

(2) Option B

When the CU provides the information related to some SIBs to the DU and/or receives a system information request requesting an SIB that is not provided to the DU, the CU transmits, to the DU, a message including a container piggybacking a response to the system information request in step S1205a. The message may be a downlink RRC transport message or a new message.

In step S1205b, the CU may transmit, to the DU, a message providing information related to a requested SIB. For example, the CU may transmit, to the DU, a message including information related to SIBy. The message may be a system information broadcast request message or a new message. The information related to the SIB included in the message may be provided per SIB. The information related to the SIB may include at least one of an SIB ID, a container including system information, timing information for broadcasting, logical channel-related information, broadcast activation, a DU ID, a cell ID, and a beam ID. Upon receiving the message from the CU, the DU may store the information related to the requested SIB.

In step S1205c, the DU may transmit a system information broadcast response message or a new message to the CU. For the requested SIB, the response message may include at least one of an SIB ID, a DU ID, a cell ID, and a beam ID corresponding to an ID included in the message received in step S1205b. For the SIB, when the ID included in the request message is not included in the response message, the CU may recognize that an entity (e.g., DU, cell and/or beam) indicated by the CU cannot broadcast the system information.

In step S1206, upon receiving the message from the CU, the DU may transmit message 4 to the UE.

In step S1207, the DU may broadcast system information related to the requested SIB. The system information related to the requested SIB may be broadcast after transmitting message 4. For the SIB, when the DU stores a cell ID or a beam ID, the DU may broadcast the system information related to the SIB in a beam or cell indicated by the ID.

In step S1208, when the CU determines to update the information related to the SIB, the CU may transmit a system information broadcast request message or a new message to the DU. The system information broadcast request message or the new message may include SIB-related information per SIB. For example, the CU may transmit, to the DU, a message including information related to updated SIBz. For example, the CU may transmit, to the DU, a message including information related to SIBz to be updated. The information related to the SIB may include at least one of an SIB ID, a container including system information, timing information for broadcasting, logical channel-related information, and broadcast activation. The broadcast activation may indicate that system information related to SIBz is not broadcast.

In step S1209, upon receiving the message from the CU, the DU may replace the previously provided information related to the SIB with the received information related to the SIB. The DU may then transmit, to the CU, a system information broadcast response message or a new message including an SIB ID related to the updated SIB.

In step S1210, regarding the requested SIB, when there is no request for on-demand system information during a particular time, the DU may determine whether to release the information related to the requested SIB in order to efficiently manage resources of the DU for storing the information related to the requested SIB.

In step S1211, when determining to release the information related to the requested SIB, the DU may transmit a system information release indication message or a new message to the DU in order to indicate that the DU does not have the information related to the SIB any more. The message may include an identity, an index, or a number of the released SIB. For example, the message may include the type of the released SIB. After transmitting the message, the DU may release the information related the indicated SIB.

According to the embodiment of the present invention, the CU may provide the DU with system information and information necessary to broadcast the system information. The information may be basically provided when supporting the broadcast of the system information. Alternatively, the information may be provided upon request from a UE. The CU may provide SIB-related information in advance to the DU, thereby reducing signaling between the CU and the DU caused by a request for on-demand system information from the UE. Furthermore, it is possible to efficiently manage resources of the DU for storing information related to a requested SIB.

Figure 13:
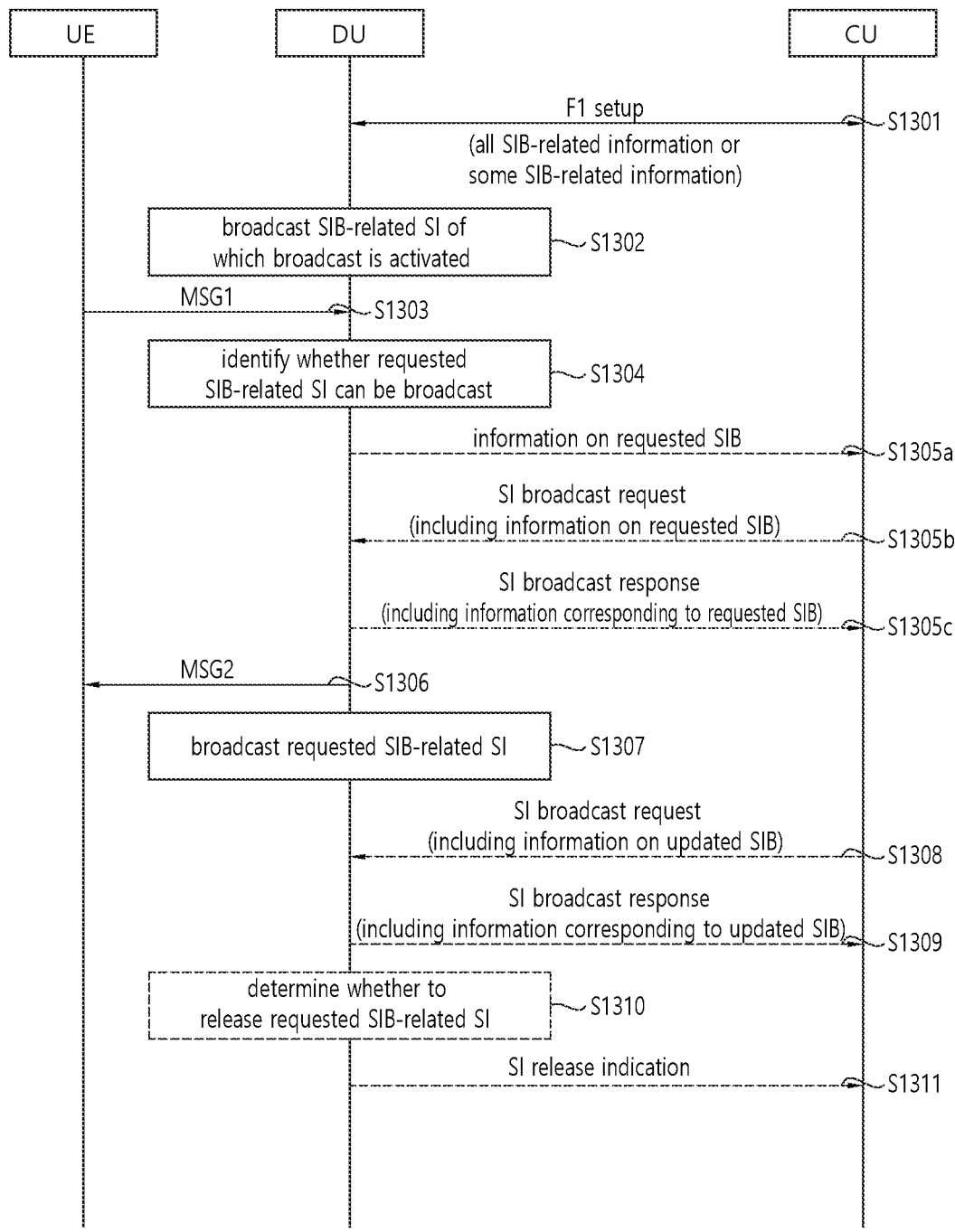
FIG. 13 illustrates a procedure for providing on-demand system information according to an embodiment of the present invention.

FIG. 13 illustrates a procedure for providing on-demand system information according to an embodiment of the present invention.

According to the embodiment of the present invention, a CU may provide a DU with information related to some or all of SIB s that the CU provides using an F1 setup procedure. In addition, when the CU receives, from the DU, a request for system information related to an SIB corresponding to on-demand system information from a UE, or determines to update information related to the SIB, the CU may transmit information related to a requested or updated SIB to the DU. Further, when there is no request for on-demand system information regarding the requested SIB, the DU may release the information related to the requested SIB.

Referring to FIG. 13, in step S1301, when an F1 interface is set up, the CU may transmit, to the DU, a message including information related to all SIBs provided by the CU. Alternatively, the CU may transmit, to the DU, a message including information related to some SIBs provided by the CU. For example, the information related to some SIBs may be minimum system information or system information on an SIB frequently requested by a UE. The information related to some SIBs may be transmitted to efficiently manage resources of the DU for storing information related to an SIB. The message may be an F1 setup response message or an F1 setup request message. For example, the CU may transmit, to the DU, a message including information related to SIBx.

The information related to the SIB included in the message may be provided per SIB. The information related to the SIB may include at least one of an SIB ID, a container including system information, timing information for broadcasting, logical channel-related information, broadcast activation, a DU ID, a cell ID, and a beam ID.

The information related to the SIB may include system information and information necessary for the DU to broadcast the system information. The container may be used to transmit the system information including one or more parameters to be broadcast from the CU to the DU. The timing information for broadcasting may be information or time for assisting scheduling for the DU to broadcast the system information. For example, the timing information for broadcasting may include at least one of the length of a window in which the system information is broadcast, the number of times the system information is broadcast, or the location of the system information broadcast within the window. For each parameter in the SIB, there may be timing information for broadcasting per parameter, which may have a different value. The logical channel-related information may include logical channel information indicating a logical channel through which the system information is transmitted. For example, the logical channel information may be a logical channel ID. The broadcast activation may indicate whether the provided system information is broadcast. The broadcast activation may be set when the system information is always broadcast or is frequently requested by a UE. When the DU controls, manages, or covers one or more cells, the F1 setup response message or the F1 setup request message may include a cell ID of each cell. When the DU controls, manages, or covers one or more beams, the F1 setup response message or the F1 setup request message may include a beam ID of each beam.

In step S1302, after an F1 setup procedure is completed, the DU may broadcast the system information related to the SIB of which a broadcast is activated.

In step S1303, a UE may transmit a system information request to the DU in order to request on-demand system information. The system information request may be included in message 1 in a random access procedure. To request system information, a preamble transmitted by the UE may be mapped to all SIBs. Alternatively, the preamble transmitted by the UE may be mapped to one or more SIBs. Such mappings may be broadcast by the DU or may be preconfigured between the DU and the UE. In addition, the UE may transmit a plurality of preambles, each of which is mapped to an SIB, to the DU. The UE may be in the RRC_IDLE state. The UE may be in the RRC_INACTIVE state.

In step S1304, upon receiving the message from the UE, the DU may identify whether the DU can broadcast system information related to an SIB on which the on-demand system information is requested. When the DU can broadcast the system information related to the SIB on which the on-demand system information is requested, the DU may skip signaling with the CU. For example, if possible, steps S1305a, S1305b, and S1305c may be omitted. When the DU cannot broadcast the system information related to the SIB on which the on-demand system information is requested, the DU may perform signaling with the CU.

In step S1305a, the DU may transmit a message including information on the requested SIB to the CU. The information on the requested SIB may indicate the requested SIB. The information on the requested SIB may be an identity, an index, or a number of the SIB identified on the basis of the system information request. The message may be an on-demand system information indication message or a new message.

In step S1305b, upon receiving the message from the DU, the CU may identify the requested on-demand system information. The CU may transmit, to the DU, a message providing the information related to the requested SIB. For example, the CU may transmit, to the DU, a message including information related to SIBy. The message may be a system information broadcast request message or a new message. The information related to the SIB included in the message may be provided per SIB. The information related to the SIB may include at least one of an SIB ID, a container including system information, timing information for broadcasting, logical channel-related information, broadcast activation, a DU ID, a cell ID, and a beam ID. Upon receiving the message from the CU, the DU may store the information related to the requested SIB.

In step S1305c, the DU may transmit a system information broadcast response message or a new message to the CU. For the requested SIB, the response message may include at least one of an SIB ID, a DU ID, a cell ID, and a beam ID corresponding to an ID included in the message received in step S1305b. For the SIB, when the ID included in the request message is not included in the response message, the CU may recognize that an entity (e.g., DU, cell and/or beam) indicated by the CU cannot broadcast the system information.

In step S1306, the DU may transmit message 2 to the UE.

In step S1307, after transmitting message 2, the DU may broadcast system information related to the requested SIB. For the SIB, when the DU stores a cell ID or a beam ID, the DU may broadcast the system information related to the SIB in a beam or cell indicated by the ID.

In step S1308, when the CU determines to update the information related to the SIB, the CU may transmit a system information broadcast request message or a new message to the DU. The system information broadcast request message or the new message may include SIB-related information per SIB. For example, the CU may transmit, to the DU, a message including information related to updated SIBz. For example, the CU may transmit, to the DU, a message including information related to SIBz to be updated. The information related to the SIB may include at least one of an SIB ID, a container including system information, timing information for broadcasting, logical channel-related information, and broadcast activation. The broadcast activation may indicate that system information related to SIBz is not broadcast.

In step S1309, upon receiving the message from the CU, the DU may replace the previously provided information related to the SIB with the received information related to the SIB. The DU may then transmit, to the CU, a system information broadcast response message or a new message including an SIB ID related to the updated SIB.

In step S1310, regarding the requested SIB, when there is no request for on-demand system information during a specific time, the DU may determine whether to release the information related to the requested SIB in order to efficiently manage resources of the DU for storing the information related to the requested SIB.

In step S1311, when determining to release the information related to the requested SIB, the DU may transmit a system information release indication message or a new message to the DU in order to indicate that the DU does not have the information related to the SIB any more. The message may include an identity, an index, or a number of the released SIB. For example, the message may include the type of the released SIB. After transmitting the message, the DU may release the information related the indicated SIB.

According to the embodiment of the present invention, the CU may provide the DU with system information and information necessary to broadcast the system information. The information may be basically provided when supporting the broadcast of the system information. Alternatively, the information may be provided upon request from a UE. The CU may provide SIB-related information in advance to the DU, thereby reducing signaling between the CU and the DU caused by a request for on-demand system information from the UE. Furthermore, it is possible to efficiently manage resources of the DU for storing information related to a requested SIB.

Figure 14:
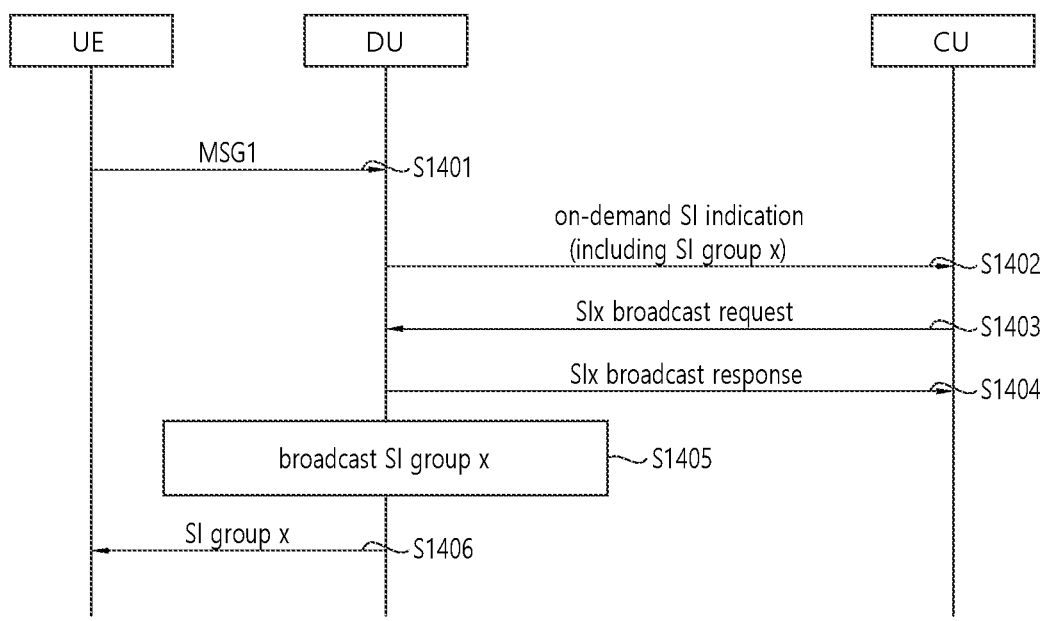
FIG. 14 illustrates a procedure for providing on-demand system information according to an embodiment of the present invention.

FIG. 14 illustrates a procedure for providing on-demand system information according to an embodiment of the present invention.

According to the embodiment of the present invention, when a CU receives a request for grouped system information broadcast from a UE through a DU or determines to broadcast one or more pieces of grouped system information, the CU may transmit, to the DU, one or more pieces of grouped system information (e.g., MIB, SIB1, and SIB2 in LTE) to be broadcasted using a message for each grouped system information.

In step S1401, a UE may transmit a system information request to the DU in order to request on-demand system information. The system information request may be included in message 1 in a random access procedure. To request system information, a preamble transmitted by the UE may be mapped to all system information groups. Alternatively, the preamble transmitted by the UE may be mapped to one or more system information groups. Such mappings may be broadcast by the DU or may be preconfigured between the DU and the UE. In addition, the UE may transmit a plurality of preambles, each of which is mapped to a system information group, to the DU. The UE may be in the RRC_IDLE state. The UE may be in the RRC_INACTIVE state.

In step S1402, upon receiving the message from the UE, the DU may transmit a message including a requested system information group to the CU on the basis of message 1 received from the UE. The message may be an on-demand system information indication message or a new message.

In step S1403, when the CU receives an on-demand system information indication message or a new message including system information group x or determines to broadcast the system information group x, the CU may transmit a message requesting the broadcast of the system information group to the DU. The message may be a SIx broadcast request message or a new message. x may refer to group x. For example, when system information group 2 and system information group 3 need to be broadcast, the CU may use a SI2 broadcast request message and a SI3 broadcast request message. The SIx broadcast request message or the new message may include at least one of system information group x, timing information for broadcasting, logical channel-related information, a DU ID, a cell ID, a beam ID, and on-demand system information-related information.

The SIx broadcast request message or the new message may include system information group x and information necessary for the DU to broadcast system information group x. System information group x may include one or more parameters to be broadcast. The timing information for broadcasting may be information or time for assisting scheduling for the DU to broadcast system information group x. For each parameter in system information group x, there may be timing information for broadcasting per parameter, which may have a different value. The logical channel-related information may include logical channel information indicating a logical channel through which system information group x is transmitted. For example, the logical channel information may be a logical channel ID. When the DU controls, manages, or covers one or more cells, the SIx broadcast request message or the new message may include a cell ID of each cell. When the DU controls, manages, or covers one or more beams, the SIx broadcast request message or the new message may include a beam ID of each beam. The on-demand system information-related information may include at least one of the length of a window in which the system information is broadcast, the number of times the system information is broadcast, or the location of the system information broadcast within the window.

In step S1404, upon receiving the request message from the CU, the DU may transmit a SIx broadcast response message or a new message to the CU. The response message may include at least one of a DU ID, a cell ID, and a beam ID corresponding to an ID included in the request message received in step S1403. When the ID included in the request message is not included in the response message, the CU may that an entity (e.g., DU, cell and/or beam) indicated by the CU cannot broadcast system information group x.

In step S1405, upon receiving the request message from the CU, the DU may store the information included in the request message. Then, the DU may broadcast system information group x on the basis of the stored information. When the SIx broadcast request message or the new message includes a cell ID or a beam ID, the DU may broadcast system information group x in a beam or cell indicated by the ID. When the SIx broadcast request message or the new message includes on-demand system information-related information, the DU may have the on-demand system information-related information or all information included in the request message while broadcasting the system information. Subsequently, the DU may remove or discard the on-demand system information-related information or all information.

In step S1406, the DU may broadcast system information group x included in the request message from the CU.

According to the embodiment of the present invention, the CU may manage system information to be broadcast to a UE in the coverage of the CU. Alternatively, the CU may provide system information upon request from the UE.

Figure 15:
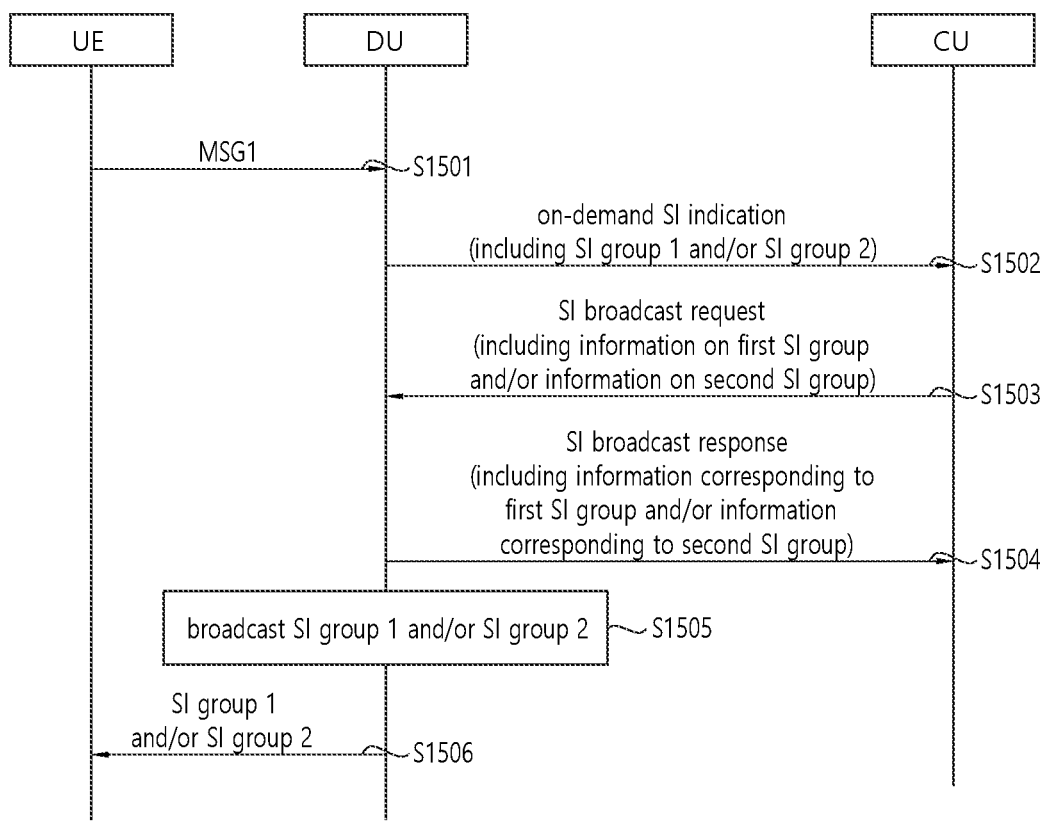
FIG. 15 illustrates a procedure for providing on-demand system information according to an embodiment of the present invention.

FIG. 15 illustrates a procedure for providing on-demand system information according to an embodiment of the present invention.

According to the embodiment of the present invention, when a CU receives a request for grouped system information broadcast from a UE through a DU or determines to broadcast one or more pieces of grouped system information, the CU may transmit, to the DU, one or more pieces of grouped system information (e.g., MIB, SIB1, and SIB2 in LTE) to be broadcasted using a single message including all grouped system information.

In step S1501, a UE may transmit a system information request to the DU in order to request on-demand system information. The system information request may be included in message 1 in a random access procedure. To request system information, a preamble transmitted by the UE may be mapped to all system information groups. Alternatively, the preamble transmitted by the UE may be mapped to one or more system information groups. Such mappings may be broadcast by the DU or may be preconfigured between the DU and the UE. In addition, the UE may transmit a plurality of preambles, each of which is mapped to a system information group, to the DU. The UE may be in the RRC_IDLE state. The UE may be in the RRC_INACTIVE state.

In step S1502, upon receiving the message from the UE, the DU may transmit a message including a requested system information group to the CU on the basis of message 1 received from the UE. The message may be an on-demand system information indication message or a new message.

In step S1503, when the CU receives an on-demand system information indication message or a new message including a system information group or determines to broadcast one or more system information groups, the CU may transmit a message requesting the broadcast of the one or more system information groups to the DU. The message may be a system information broadcast request message or a new message. The message may include information per system information group.

For example, the message may include information on a first system information group and information on a second system information group. The information on the first system information group may include at least one of system information group 1, timing information for broadcasting, logical channel-related information, a DU ID, a cell ID, ID, a beam ID, and on-demand system information-related information. The information on the second system information group may include at least one of system information group 2, timing information for broadcasting, logical channel-related information, a DU ID, a cell ID, ID, a beam ID, and on-demand system information-related information.

The information on each system information group may include system information group and information necessary for the DU to broadcast the system information group. The system information group may include one or more parameters to be broadcast. The timing information for broadcasting may be information or time for assisting scheduling for the DU to broadcast the system information group. For each parameter in the system information group, there may be timing information for broadcasting per parameter, which may have a different value. The logical channel-related information may include logical channel information indicating a logical channel through which the system information group is transmitted. For example, the logical channel information may be a logical channel ID. When the DU controls, manages, or covers one or more cells, the system information broadcast request message or the new message may include a cell ID of each cell. When the DU controls, manages, or covers one or more beams, the system information broadcast request message or the new message may include a beam ID of each beam. The on-demand system information-related information may include at least one of the length of a window in which the system information is broadcast, the number of times the system information is broadcast, or the location of the system information broadcast within the window.

In step S1504, upon receiving the request message from the CU, the DU may transmit a system information broadcast response message or a new message to the CU. For each system information group, the response message may include at least one of a DU ID, a cell ID, and a beam ID corresponding to an ID included in the request message received in step S1503. For example, for the first system information group, when the ID included in the request message is not included in the response message, the CU may that an entity (e.g., DU, cell and/or beam) indicated by the CU cannot broadcast the first system information group.

In step S1505, upon receiving the request message from the CU, the DU may store the information included in the first system information group and/or the second system information group. Then, the DU may broadcast system information group 1 and/or system information group 2 on the basis of the stored information. For example, for the first system information group, when the system information broadcast request message or the new message includes a cell ID or a beam ID, the DU may broadcast system information group 1 in a beam or cell indicated by the ID. Further, when the system information broadcast request message or the new message includes on-demand system information-related information on the first system information group, the DU may have all information on the first system information group included in the request message or the on-demand system information-related information while broadcasting the system information on the first system information group. Subsequently, the DU may remove or discard all information on the first system information group or the on-demand system information-related information.

In step S1506, the DU may broadcast system information group 1 and/or system information group 2 respectively included in the information on the first system information group and/or the information on the second system information group.

According to the embodiment of the present invention, the CU may manage system information to be broadcast to a UE in the coverage of the CU. Alternatively, the CU may provide system information to the DU upon request from the UE. Furthermore, the CU can provide a plurality of pieces of system information at the same time in a single procedure, thereby reducing signaling between the CU and the DU.

Figure 16:
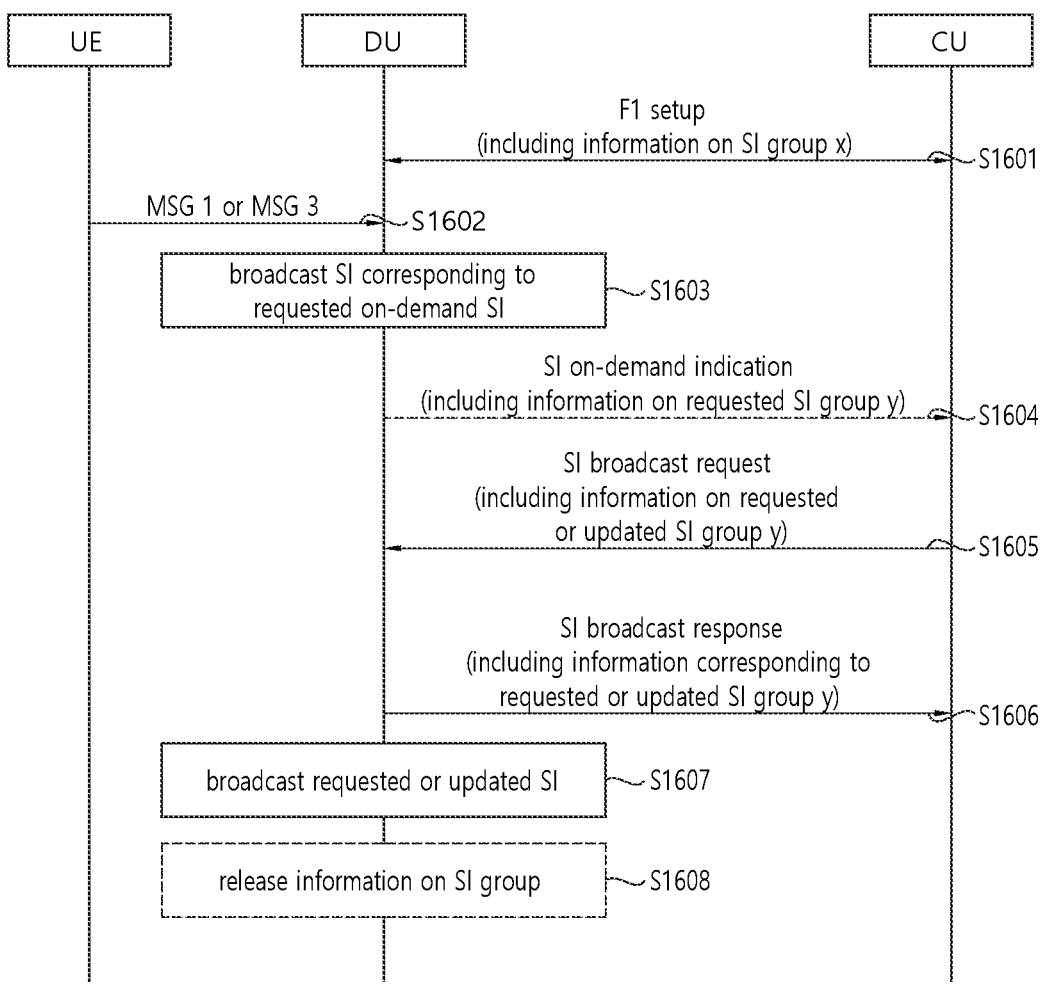
FIG. 16 illustrates a procedure for providing on-demand system information according to an embodiment of the present invention.

FIG. 16 illustrates a procedure for providing on-demand system information according to an embodiment of the present invention.

According to the embodiment of the present invention, a CU may provide a DU with grouped system information to be broadcast, which is provided by the CU, using an F1 setup procedure. For example, the grouped system information may be an MIB, SIB1 or SIB2 in LTE. In addition, when the CU receives, from the DU, a request for grouped system information corresponding to on-demand system information from a UE or determines to update grouped system information, the CU may transmit the requested or updated grouped system information to the DU.

Referring to FIG. 16, in step S1601, when an F1 interface is set up, the CU may transmit, to the DU, a message including all system information groups provided by the CU. Alternatively, the CU may transmit, to the DU, a message including some system information groups provided by the CU. For example, some system information groups may be a minimum system information group or a system information group frequently requested by a UE. Some system information groups may be transmitted to efficiently manage resources of the DU for storing information related to a system information group. The message may be an F1 setup response message or an F1 setup request message. For example, the CU may transmit, to the DU, a message including information related to system information group x.

The information related to the system information group included in the message may be provided per system information group. The information related to the system information group may include at least one of the system information group, timing information for broadcasting, logical channel-related information, a DU ID, a cell ID, and a beam ID.

The information related to the system information group may include the system information group and information necessary for the DU to broadcast the system information group. The system information group may include one or more parameters to be broadcast. The timing information for broadcasting may be information or time for assisting scheduling for the DU to broadcast the system information group. For example, the timing information for broadcasting may include at least one of the length of a window in which the system information is broadcast, the number of times the system information is broadcast, or the location of the system information broadcast within the window. For each parameter in the system information group, there may be timing information for broadcasting per parameter, which may have a different value. The logical channel-related information may include logical channel information indicating a logical channel through which the system information group is transmitted. For example, the logical channel information may be a logical channel ID. When the DU controls, manages, or covers one or more cells, the F1 setup response message or the F1 setup request message may include a cell ID of each cell. When the DU controls, manages, or covers one or more beams, the F1 setup response message or the F1 setup request message may include a beam ID of each beam.

After an F1 setup procedure is completed, the DU may broadcast system information on the basis of the information received from the CU.

In step S1602, a UE may transmit a system information request to the DU in order to request on-demand system information. The system information request may be included in message 1 or message 3 in a random access procedure. To request system information, a preamble transmitted by the UE may be mapped to all system information groups. Alternatively, the preamble transmitted by the UE may be mapped to one or more system information groups. Such mappings may be broadcast by the DU or may be preconfigured between the DU and the UE. In addition, the UE may transmit a plurality of preambles, each of which is mapped to a system information group, to the DU. The UE may be in the RRC_IDLE state. The UE may be in the RRC_INACTIVE state.

In step S1603, upon receiving the message from the UE, the DU may identify whether the DU can broadcast the received on-demand system information. When the DU can broadcast the received on-demand system information, the DU may broadcast system information corresponding to the requested on-demand system information.

In step S1604, when the DU has some system information groups provided by the CU and cannot broadcast the system information corresponding to the on-demand system information received from the UE, the DU may transmit, to the CU, a message including a system information group requested via message 1 or message 3. The message may be a system information on-demand indication message or a new message. The requested system information group may be associated with the on-demand system information.

In step S1605, when the CU receives the system information on-demand indication message or the new message or determines to update the system information group, the CU may transmit, to the DU, a message providing the requested or updated system information group. For example, the CU may transmit, to the DU, a message including information related to requested or updated system information group y. The message may be a system information broadcast request message or a new message. Information related to the system information group included in the message may be provided per system information group. The information related to the system information group may include at least one of the system information group, timing information for broadcasting, logical channel-related information, a DU ID, a cell ID, and a beam ID.

In step S1606, upon receiving the message from the CU, the DU may transmit a system information broadcast response message or a new message to the CU. For requested or updated system information group y, the response message may include at least one of a DU ID, a cell ID, and a beam ID corresponding to an ID included in the message received in step S1605. For system information group y, when the ID included in the request message is not included in the response message, the CU may recognize that an entity (e.g., DU, cell and/or beam) indicated by the CU cannot broadcast system information group y.

In step S1607, upon receiving the message from the CU, the DU may store the information included in system information group y. Alternatively, the DU may replace the previous information with the information included in system information group y. Then, the DU may broadcast the system information group on the basis of the stored or replaced information. For system information group y, when the system information broadcast request message or the new message includes a cell ID or a beam ID, the DU may broadcast system information group y in a beam or cell indicated by the ID.

In step S1608, regarding the system information group, when there is no request for on-demand system information during a specific time, the DU may release all information related to the system information group in order to efficiently manage resources of the DU for storing the information related to the system information group.

According to the embodiment of the present invention, the CU may provide the DU with system information to be broadcast to a UE in the coverage of the CU. Alternatively, the CU may provide system information to the DU upon request from the UE. Furthermore, the CU may provide the DU with information related to a system information group in advance, thereby reducing signaling between the CU and the DU caused by a request for on-demand system information from the UE.

Figure 17:
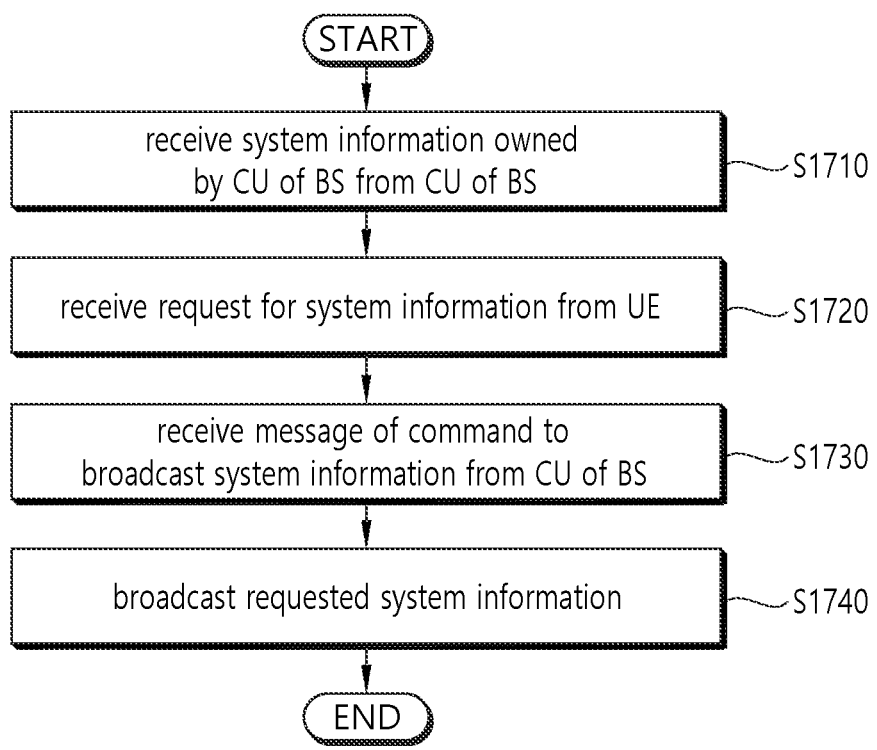
FIG. 17 is a block diagram illustrating a method for a distributed unit of a base station to provide system information according to an embodiment of the present invention.

FIG. 17 is a block diagram illustrating a method for a DU of a BS to provide system information according to an embodiment of the present invention Referring to FIG. 17, in step S1710, the DU of the BS may receive system information owned by a CU of the BS from the CU of the BS. The system information owned by the CU of the BS may be included in a container and may be transmitted from the CU of the BS to the DU of the BS. The system information owned by the CU of the BS may be transmitted from the CU of the BS to the DU of the BS in an F1 setup procedure. The system information received from the CU of the BS may be all system information excluding SIB1 among the system information owned by the CU of the BS.

The CU may be a logical node that hosts radio resource control (RRC), service data adaptation protocol (SDAP), and packet data convergence protocol (PDCP) layers of the BS, and the DU may be a logical node that hosts radio link control (RLC), media access control (MAC), and physical (PHY) layers of the BS.

The system information may be on-demand system information broadcasted upon request from a UE. The system information may be other system information.

In step S1720, the DU of the BS may receive a request for the system information from the UE. The request for the system information may be transmitted from the UE to the DU of the BS in a random access procedure. The request for the system information may be included in message 3.

The system information received from the CU of the BS may include the requested system information.

In addition, when the system information received from the CU of the BS does not include the requested system information, the DU of the BS may receive the requested system information from the CU of the BS.

Further, the DU of the BS may transmit the request for the system information to the CU of the BS. The request for the system information may be included in a container and may be transmitted from the DU of the BS to the CU of the BS.

In step S1730, the DU of the BS may receive a message of a command to broadcast the system information from the CU of the BS. The message of the command to broadcast the requested system information may include the type of the requested system information. The message of the command to broadcast the requested system information may include time information for broadcasting the requested system information. The time information may be a broadcast time interval.

In step S1740, the DU of the BS may broadcast the requested system information. Alternatively, the DU of the BS may transmit the requested system information to the UE through dedicated signaling.

Figure 18:
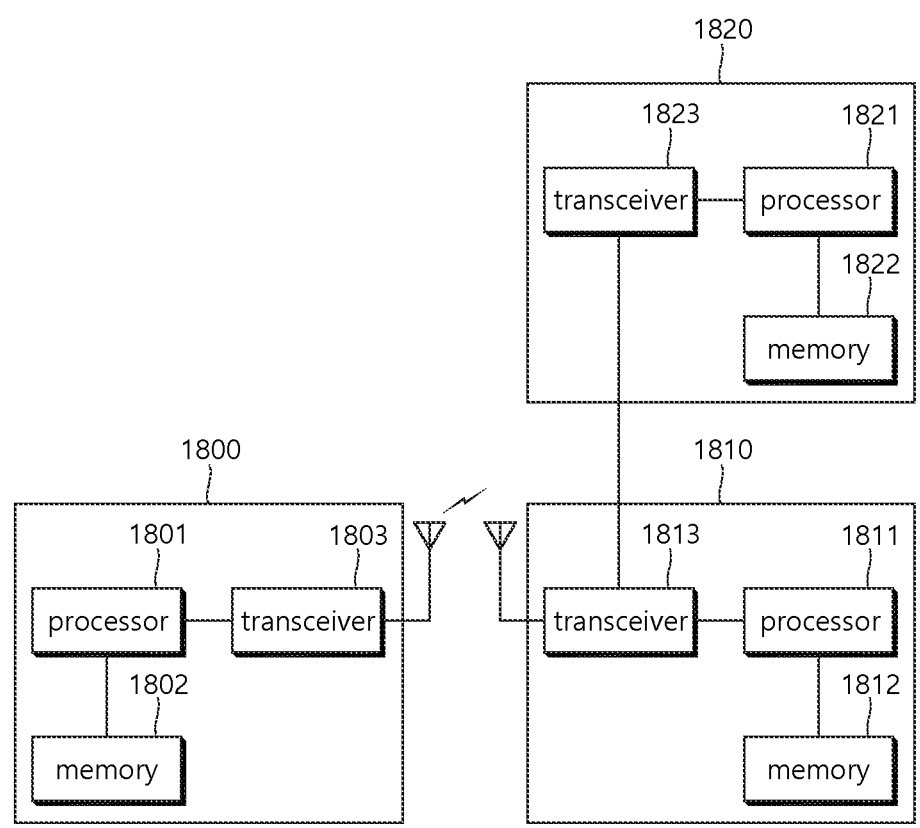
FIG. 18 is a block diagram illustrating a wireless communication system according to the embodiment of the present invention.

FIG. 18 is a block diagram illustrating a wireless communication system according to the embodiment of the present invention.

A UE 1800 includes a processor 1801, a memory 1802 and a transceiver 1803. The memory 1802 is connected to the processor 1801, and stores various pieces of information for driving the processor 1801. The transceiver 1803 is connected to the processor 1801, and transmits and/or receives radio signals. The processor 1801 implements proposed functions, processes and/or methods. In the above embodiment, an operation of the user equipment may be implemented by the processor 1801.

A DU of a base station 1810 includes a processor 1811, a memory 1812 and a transceiver 1813. The memory 1812 is connected to the processor 1811, and stores various pieces of information for driving the processor 1811. The transceiver 1813 is connected to the processor 1811, and transmits and/or receives radio signals. The processor 1811 implements proposed functions, processes and/or methods. In the above embodiment, an operation of the DU may be implemented by the processor 1811.

A CU of the base station 1820 includes a processor 1812, a memory 1822 and a transceiver 1823. The memory 1822 is connected to the processor 1821, and stores various pieces of information for driving the processor 1821. The transceiver 1823 is connected to the processor 1821, and transmits and/or receives radio signals. The processor 1821 implements proposed functions, processes and/or methods. In the above embodiment, an operation of the CU may be implemented by the processor 1821.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for a User Equipment (UE) in RRC_IDLE and/or RRC_INACTIVE in a wireless communication system,
   wherein the wireless communication system includes an NG-RAN including a distributed unit (DU) and a central unit (CU), and
   wherein the DU receives, from the CU, an F1 setup response message including multiple system information blocks (SIBs) provided by the CU, the method comprising:
   transmitting, by the UE to the NG-RAN, a system information request for a specific system information block (SIB),
   wherein the DU transmits, to the CU, the system information request via a first message including a container which piggybacks the system information request,
   wherein the DU receives, from the CU, a second message including an enumerated type of the specific SIB, wherein the enumerated type identifies the specific SIB among the multiple SIBs provided by the CU, and wherein, upon receiving the second message from the CU, the DU broadcasts a system information (SI) message related to the specific SIB; and receiving, by the UE from the DU, the SI message related to the specific SIB, wherein the CU has a radio resource control (RRC) layer, a service data adaptation protocol (SDAP) layer, and a packet data convergence protocol (PDCP) layer, and wherein the DU has a radio link control (RLC) layer, a media access control (MAC) layer, and a physical (PHY) layer.

2. The method of claim 1, wherein the enumerated type of the specific SIB is an integer index that identifies the specific SIB among integer indices associated with the multiple SIBs that were provided by the CU.

3. The method of claim 1, wherein the DU determines whether to release the specific SIB, and wherein the DU releases information related to the specific SIB based on a determination to release the specific SIB.

4. The method of claim 1, wherein the multiple SIBs provided by the CU are included in a container in the F1 setup response message.

5. The method of claim 4, wherein the F1 setup response message includes information related to a system information message containing each of the multiple SIBs.

6. The method of claim 1, wherein the system information request is transmitted from the UE by being included in a message 3 of a random access procedure.

7. The method of claim 1, wherein the UE is in communication with at least one of a mobile device, a network, and/or autonomous vehicles other than the UE.

8. A User Equipment (UE) in RRC_IDLE and/or RRC_INACTIVE configured to operate in a wireless communication system, wherein the wireless communication system includes an NG-RAN including a distributed unit (DU) and a central unit (CU), and wherein the DU receives, from the CU, an F1 setup response message including multiple system information blocks (SIBs) provided by the CU, the UE comprising:

a transceiver;

at least one processor; and at least one computer memory operably connectable to the at least one processor and storing instructions that, based on being executed by the at least one processor, perform operations comprising:

transmitting, to the NG-RAN, a system information request for a specific system information block (SIB), wherein a distributed unit (DU) transmits, to a central unit (CU), the system information request via a first message including a container which piggybacks the system information request, wherein the DU receives, from the CU, a second message including an enumerated type of the specific SIB, wherein the enumerated type identifies the specific SIB among the multiple SIBs provided by the CU, and wherein, upon receiving the second message from the CU, the DU broadcasts a system information (SI) message related to the specific SIB; and receiving, from the DU, the SI message related to the specific SIB, wherein the CU has a radio resource control (RRC) layer, a service data adaptation protocol (SDAP) layer, and a packet data convergence protocol (PDCP) layer, and wherein the DU has a radio link control (RLC) layer, a media access control (MAC) layer, and a physical (PHY) layer.

9. The UE of claim 8, wherein the enumerated type of the specific SIB is an integer index that identifies the specific SIB among integer indices associated with the multiple SIBs that were provided by the CU.

10. The UE of claim 8, wherein the DU determines whether to release the specific SIB, and wherein the DU releases information related to the specific SIB based on a determination to release the specific SIB.

11. The UE of claim 8, wherein the multiple SIBs provided by the CU are included in a container in the F1 setup response message.

12. The UE of claim 11, wherein the F1 setup response message includes information related to a system information message containing each of the multiple SIBs.

13. The UE of claim 8, wherein the system information request is transmitted from the UE via by being included in a message 3 of a random access procedure.

14. A method for a central unit (CU) of an NG-RAN in a wireless communication system, the method comprising:

transmitting, by the CU to a distributed unit (DU) of the NG-RAN, an F1 setup response message including multiple system information blocks (SIBs) provided by the CU, wherein the DU receives, from a wireless device, a system information request for a specific SIB;

receiving, by the CU from the DU, the system information request via a first message including a container which piggybacks the system information request; and transmitting, by the CU to the DU, a second message including an enumerated type of the specific SIB, wherein the enumerated type identifies the specific SIB from among the multiple SIBs provided by the CU, wherein upon receiving the second message from the CU, the DU broadcasts a system information (SI) message related to the specific SIB, wherein the CU has a radio resource control (RRC) layer, a service data adaptation protocol (SDAP) layer, and a packet data convergence protocol (PDCP) layer, and wherein the DU has a radio link control (RLC) layer, a media access control (MAC) layer, and a physical (PHY) layer.

15. The method of claim 14, wherein the enumerated type of the specific SIB is an integer index that identifies the specific SIB among integer indices associated with the multiple SIBs that were provided by the CU.

16. The method of claim 14, wherein the DU determines whether to release the specific SIB, and wherein the DU releases information related to the specific SIB based on a determination to release the specific SIB.

17. The method of claim 14,
wherein the multiple SIBs provided by the CU are included in a container in the F1 setup response message.

* * * * *